United States Patent [19]

Ramakrishnan et al.

[11] Patent Number: 5,794,073

[45] Date of Patent: Aug. 11, 1998

[54] ARBITRATION SYSTEM FOR A SHARED DMA LOGIC ON A NETWORK ADAPTER WITH A LARGE NUMBER OF COMPETING PRIORITY REQUESTS HAVING PREDICTED LATENCY FIELD

[75] Inventors: Kadangode K. Ramakrishnan, Maynard, Mass.; Michael Ben-Nun, Jerusalem, Israel; Peter John Roman, Hopkington, Mass.

[73] Assignee: Digital Equipment Corporation, Maynard, Mass.

[21] Appl. No.: 789,814

[22] Filed: Jan. 29, 1997

Related U.S. Application Data

[63] Continuation of Ser. No. 335,538, Nov. 7, 1994, abandoned.

[51] Int. Cl.$^6$ .................................................. G06F 13/00
[52] U.S. Cl. .......................... 395/860; 395/859; 395/842; 395/848
[58] Field of Search ..................................... 395/732, 864, 395/866, 860, 859, 842, 848; 370/429, 399, 474, 462, 235, 232

[56] References Cited

U.S. PATENT DOCUMENTS

| | | | |
|---|---|---|---|
| 5,136,584 | 8/1992 | Hedlund | 370/399 |
| 5,166,930 | 11/1992 | Braff et al. | 370/235 |
| 5,231,633 | 7/1993 | Hluchyj et al. | 370/429 |
| 5,245,603 | 9/1993 | Newman | 370/462 |
| 5,301,333 | 4/1994 | Lee | 395/732 |
| 5,396,490 | 3/1995 | White et al. | 370/474 |
| 5,515,363 | 5/1996 | Ben-Nun et al. | 370/232 |

Primary Examiner—Frank J. Asta
Assistant Examiner—Le Hien Luu
Attorney, Agent, or Firm—David A. Dagg

[57] ABSTRACT

In accordance with principles of the invention, there is provided an arbitration system for multiple requesters of a shared data transfer resource, such as a system bus or a peripheral bus. The disclosed system arbitrates among multiple classes of requesters which are divided into multiple levels of a request hierarchy. In the example embodiment, the multiple requesters include logic for processing received data from the network, logic for processing data to be transmitted onto the network, logic for moving transmit and receive descriptors between the host memory and the adapter, logic for reporting status from the adapter to the host, and logic for generating an error and maintenance status update from the adapter to the host. The new system ensures fairness between transmit and receive processes, that FIFOs associated with transmit queues are not underrun, and further that notification of non-error and maintenance status changes are processed with minimal latency.

3 Claims, 10 Drawing Sheets

FIRST ARBITRATION STAGE
GRANT PROCESSING LOGIC

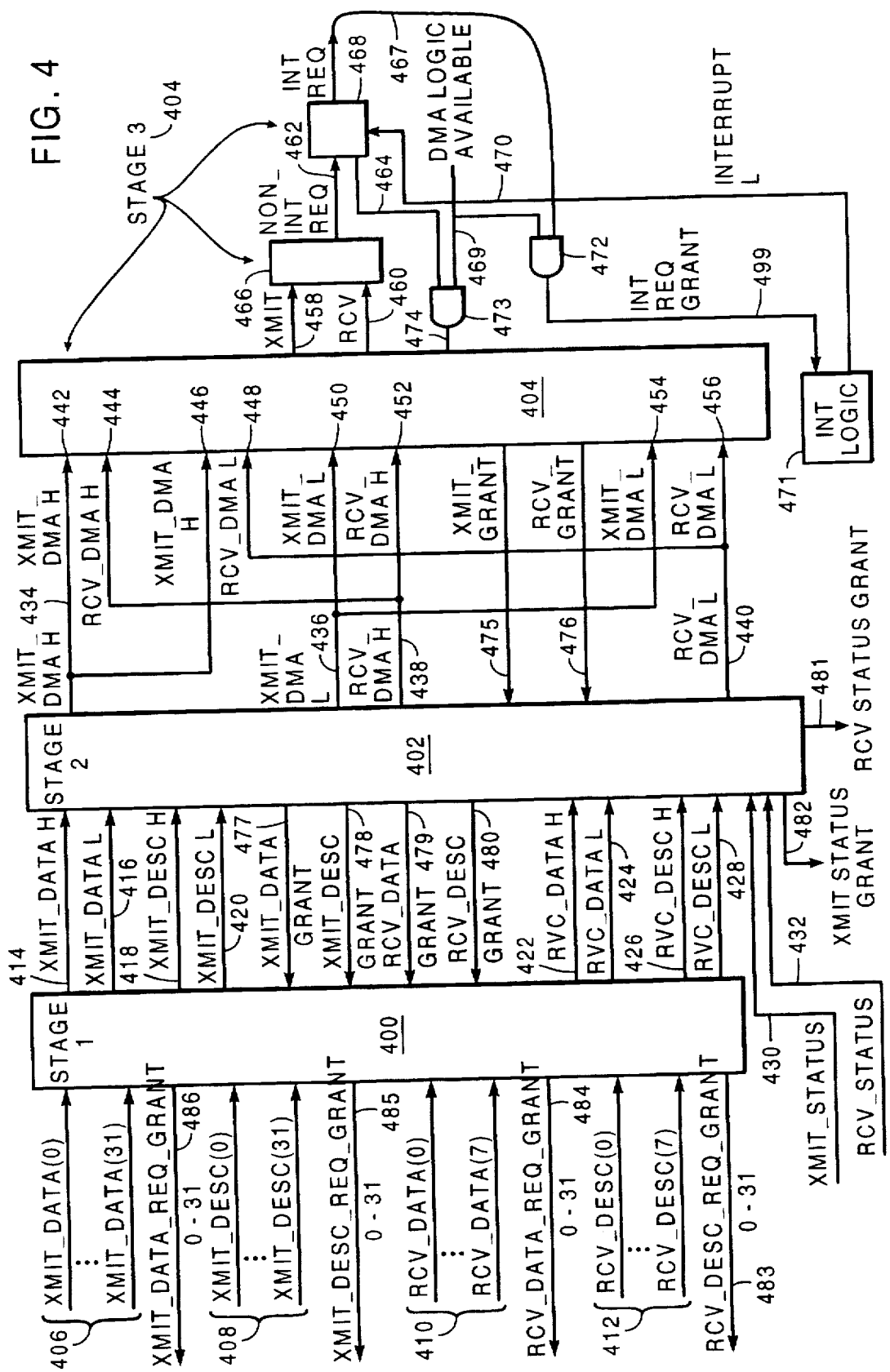

GRANT PROCESSING LOGIC

SECOND ARBITRATION STAGE
GRANT PROCESSING LOGIC

THIRD ARBITRATION STAGE
GRANT PROCESSING

PRIORITY VECTOR

FIRST ARBITRATION STAGE REQUEST
LOGIC FOR TRANSMIT DATA REQUESTS

FIRST ARBITRATION STAGE REQUEST
LOGIC FOR RECEIVE DATA REQUESTS

FIRST ARBITRATION STAGE
REQUEST LOGIC FOR RECEIVE
DESCRIPTOR REQUESTS

SECOND ARBITRATION
STAGE REQUEST LOGIC
FOR TRANSMIT REQUESTS

SECOND ARBITRATION
STAGE REQUEST LOGIC
FOR TRANSMIT REQUESTS

THIRD ARBITRATION
STAGE REQUEST LOGIC

5,794,073

ARBITRATION SYSTEM FOR A SHARED DMA LOGIC ON A NETWORK ADAPTER WITH A LARGE NUMBER OF COMPETING PRIORITY REQUESTS HAVING PREDICTED LATENCY FIELD

This is a continuation of Ser. No. 08/335,538 filed on Nov. 7, 1994 now abandoned.

FIELD OF THE INVENTION

This invention relates generally to computer systems and arbitration for a shared data transfer resource, and specifically to transfer of data between a host memory and a network adapter through a shared bus.

BACKGROUND

In computer networks, network adapters are used to connect host computer systems to external computer networks. A network adapter is typically coupled with the host computer system through a shared data transfer resource, such as a peripheral bus or system bus. Also normally accessible through the shared bus is a host memory, in which data structures that are shared between the adapter and the host computer system are stored. The host memory typically contains data in the form of cells or packets that are to be transferred to the network adapter and subsequently transmitted onto the computer network. Further, the host memory is used to store cells and packets written by the network adapter after the cells and packets are received from the computer network.

The shared bus that is used to couple the network adapter with the host computer system is shared among multiple competing processes within the network adapter. These processes must be granted access to the shared bus in a manner that is fair and which guarantees minimal service levels negotiated for virtual circuits created by the host computer system through the network adapter. Access to the bus by requesters within the network adapter is effectuated by granting access to a set of logic that operates the bus for the network adapter, such as a Direct Memory Access (DMA) logic.

For example, in computer networking technologies such as Asynchronous Transfer Mode (ATM), virtual circuits are established having several negotiated performance parameters. These performance parameters are known as Quality of Service (QoS) parameters. Quality of Service parameters include average throughput, peak throughput, and latency tolerance. In order that the level of performance guaranteed by the QoS parameters not be compromised, access to any shared resources must be allocated among multiple requesters associated with multiple virtual circuits in accordance with the negotiated quality of service parameters for each virtual circuit. This problem is exacerbated by the large number of virtual circuits permitted in computer network technologies such as ATM.

In an alternative example of modern networking technology, there is also the concept of "flows" for a negotiated service level. In such systems, the service level may be defined on a packet by packet basis, without necessarily setting up virtual circuits, and without creating cells from packets. In this type of system, access to the shared resource must be allocated such that the negotiated service level is similarly maintained, albeit on a packet by packet basis.

A further problem exists in communication of status information from the network adapter to the host computer system. Such information is often passed through the same shared bus resource over which packet or cell data is passed. If this information is not communicated in a timely manner between the network adapter and the host computer system, any efficiencies in moving data between the host and the network adapter will be negated. It is therefore further required that the shared bus be used to communicate status information in a manner that does not adversely effect the transmit or receive performance of the network adapter.

In existing systems, there are a relatively small number of requesters. For example, in a system having only one transmit queue and one receive queue in the host, there can be only a proportionally small number of competing requests for any shared data transfer resource, since the processing within each of the two queues is typically sequential. However, when a large number of independent transmit and receive queues are used, many concurrent requests for access to the shared data transfer resource may be simultaneously present. These multiple concurrent requests must be processed correctly, and with consideration of the relative priority or negotiated service level of each request.

The contents of transmit and receive queues in host memory are generally some number of descriptors, each descriptor identifying an area of host memory in which data is or may be stored. In existing systems, the networking adapter has obtained descriptors and data from the host in a strictly sequential fashion. For example on transmit, the adapter first reads one or more descriptors, followed by the data indicated by those descriptors. When multiple independent queues are used, it is desirable to interleave different types of requests from different data flows, such as requests to move descriptors from a first host queue and requests to move data indicated by descriptors already fetched from a second host queue.

Also in systems using multiple transmit queues within the host computer system, it is impracticable to use a large FIFO in the adapter to store data for each transmit queue. Therefore a system of arbitrating for requests to move data from the multiple transmit queues into the FIFOs within the adapter must efficiently allocate access to any shared data transfer resource. Otherwise a FIFO may be underrun, potentially resulting in the QoS parameters for a connection being violated. This problem is particularly difficult because the future availability of the shared resource may be difficult to predict. Each request for the shared data transfer resource must therefore be processed in a way that avoids underrunning any of the FIFOS such that they do. not become empty.

In addition to the above design issues there is also a well known problem of maintaining fairness between transmit and receive operations. Thus it is required that neither transmit nor receive data be given excessive priority over the other.

It is therefore desirable to have a new system for arbitrating between multiple requesters for a shared resource such as a peripheral bus. The new system should be tailored to meet the needs of a network adapter for networking technologies such as ATM. Such a new system should also provide support for Quality of Service requirements of a multiple virtual circuit system such as ATM. And further the system should provide service for a large number of potential requesters. An acceptable degree of fairness must be guaranteed between transmit and receive operations. And the new design should be flexible enough so that parameters may be adjusted to control the eventual service provided to different parts of the system in the network adapter so that fairness is perceived by the eventual users of the network.

SUMMARY

In accordance with principles of the invention, there is provided an arbitration system for multiple requesters of a shared data transfer resource, such as a system bus or a peripheral bus. The disclosed system arbitrates among a large number of request classes which are divided into multiple levels of a request hierarchy. In the example embodiment, the multiple requesters include logic for processing received data from the network, logic for processing data to be transmitted onto the network, logic for moving transmit and receive descriptors between the host memory and the adapter, logic for reporting non-error and maintenance status information from the adapter to the host, and logic for generating error and maintenance status information from the adapter to the host.

In the disclosed embodiment, non-error and maintenance status updates provide information to the host memory such as consumer pointers within the adapter. Error and maintenance status updates provide information to the host memory such as the value of error counters.

The new system ensures fairness between transmit and receive processes, that FIFOs associated with transmit queues are not underrun, and further that notifications of non-error and maintenance status information are processed quickly. Also, latency of delivering received data to the host is minimized.

In a disclosed example embodiment, there is described a system for arbitrating between multiple requests for a shared resource. The requests are divided into request classes. The example system includes a logic process for determining a relative priority of each request in a first request class. The first request class consists of requests to move data from host memory into an adapter for transmission onto a network. The example further includes a logic process for determining a high or a low priority of each request in a second request class. The second request class consists of requests to move transmit queue descriptors from a host memory into the adapter. A logic process is further provided to select one request from the first request class having a highest relative priority.

The example embodiment also includes a logic process for selecting a request from the second request class having a high priority. The second request class consists of requests to move descriptors from the host into the network adapter. An arbitration process is then used to choose between the request selected from the first request class and the request selected from the second request class. The arbitration process is based on a 1 of N round robin arbitration, and selects a request from the second request class once every N times the shared resource is available, where N is a predetermined integer.

The disclosed system also provides for processing of requests associated with reading of descriptors from a relatively large number of receive queues in host memory, as well as requests to move data from the network adapter into areas in host memory indicated by those descriptors read from the receive queues. Moreover, the system processes requests for the shared resource to write non-error and maintenance status information into the host memory, as well as requests to write error and maintenance information. The system allows non-error and maintenance status information such as updated consumer pointers to be written to the host with minimal latency. In addition, error and maintenance status information, such as performance counters and indication of non-fatal errors, is piggy-backed onto non-error and maintenance status information. Thus whenever a non-error and maintenance status update request is granted, any current error and maintenance information is also written into the host memory. Further, non-error and maintenance status update requests are allowed independent access to the shared resource at a relatively low priority.

The system handles all of these requests in such a way that the shared resource is allocated consistent with quality of service parameters for existing virtual circuits, and latency is minimized in providing service to requests to write non-error and maintenance status information into the host memory.

These and other features of the present invention will become apparent from a reading of the detailed description in conjunction with the attached drawings in which like reference numerals refer to like elements in several views.

BRIEF DESCRIPTION OF THE DRAWINGS

FIG. 4 is a diagram of an example embodiment of a three stage arbitration system;

DETAILED DESCRIPTION

Figure 1:
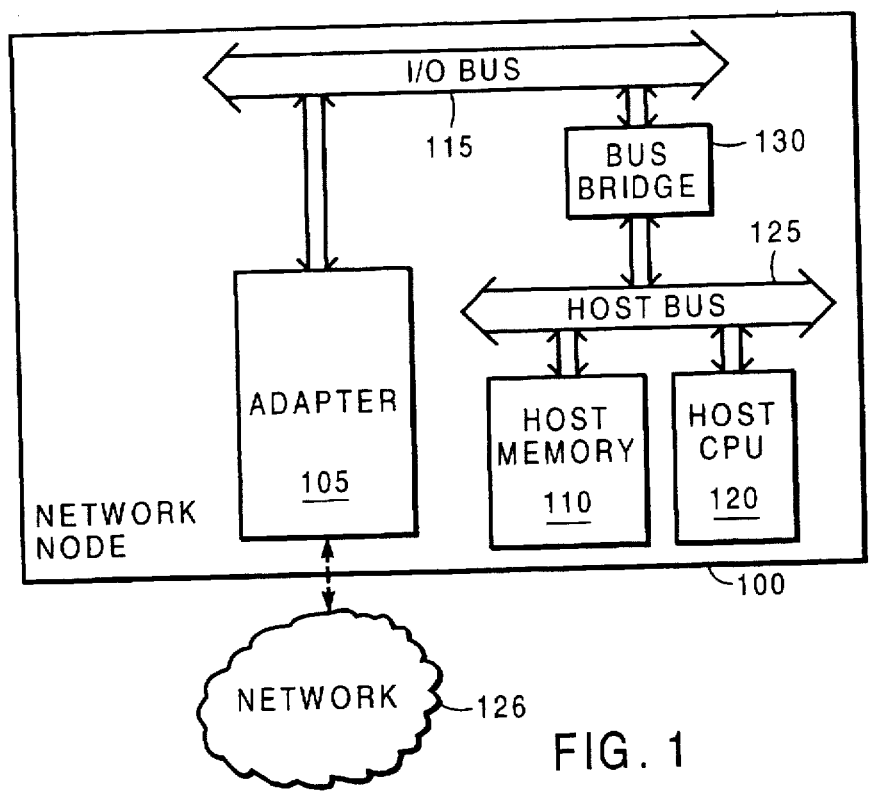
FIG. 1 is a diagram of a network node having a network adapter.

FIG. 1 shows a Network Node 100 having a Host Memory 110 and a Host CPU 120 coupled with a Host Bus 125. The Host Bus 125 is coupled with a Bus Bridge 130, which in turn is coupled with an I/O Bus 115. The I/O Bus 115 is coupled with a Network Adapter (Adapter) 105, which in turn is coupled with a Network 126.

During operation of the elements in FIG. 1, the Adapter 105 moves data between the Network 125 and the Host Memory 110 via the I/O Bus 115. For purposes of example the Network 125 may be an Asynchronous Transfer Mode network, or other, such as Ethernet, FDDI, or Token Ring.

Figure 2:
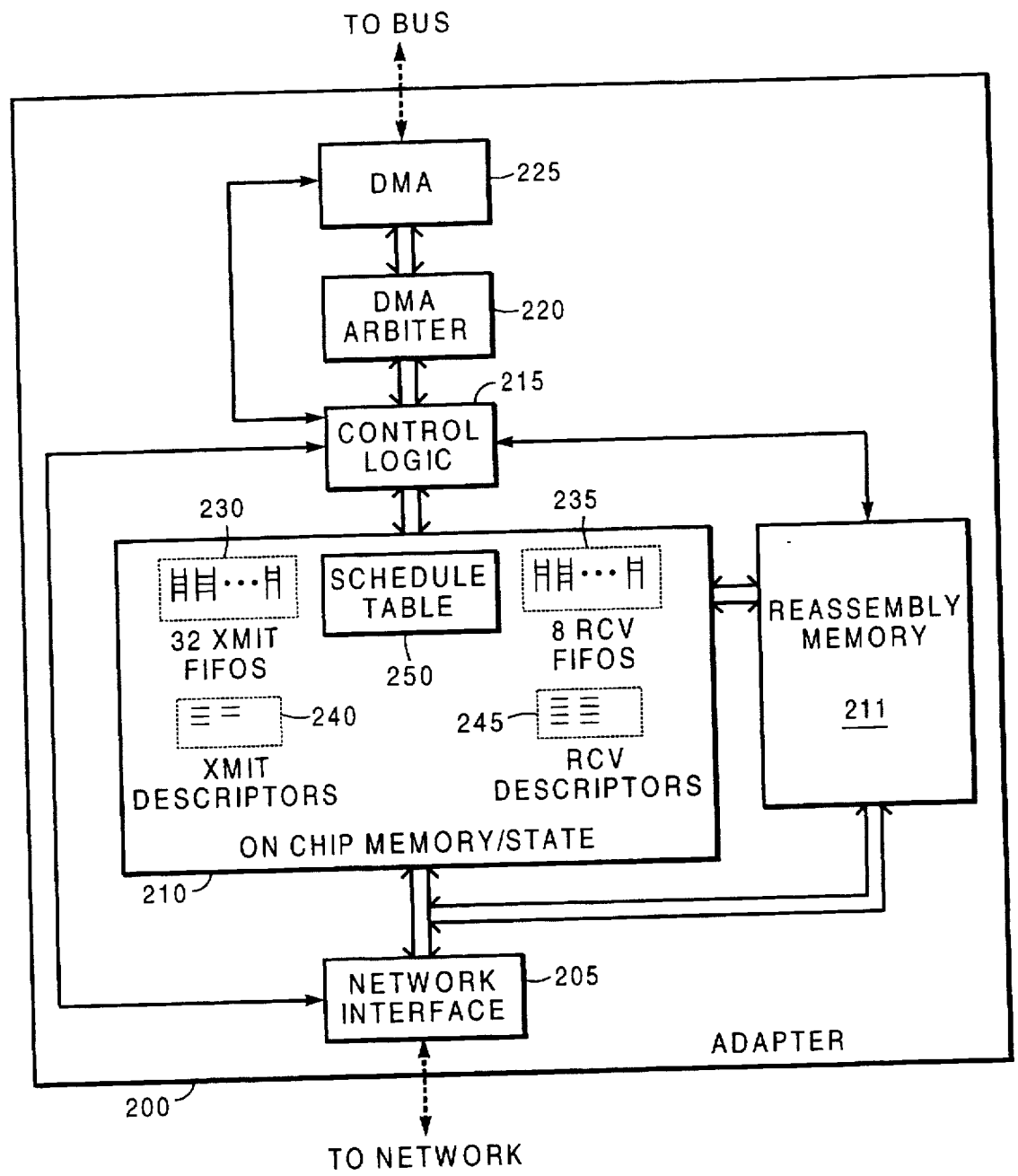
FIG. 2 is a detailed diagram of the elements in an example embodiment of the network adapter shown in FIG. 1.

FIG. 2 is a detailed drawing of an example embodiment of the Adapter 105 as shown in FIG. 1. FIG. 2 shows an Adapter 200 having a State Memory 210 coupled with a Control Logic 215, a Network Interface 205, and a Reassembly Memory 211. The Network Interface 205 is further coupled with a network, for example, the Network 125 as shown in FIG. 1. The State Memory 210 is further coupled with a Control Logic 215. The Control Logic 215 is further coupled with the Network Interface 205, a DMA Arbiter 220, the Reassembly Memory 211 and a DMA 225. The DMA 225 is a Direct Memory Access logic, and is also coupled with the DMA Arbiter 220 and a bus, for example the I/O BUS 115 as shown in FIG. 1.

In an example embodiment, the elements of FIG. 2, such as the DMA 225, the DMA Arbiter 220, Control Logic 215 and Network interface 205 may be implemented in a combination of Application Specific Integrated Circuits (ASICs)e discrete logic elements, and/or software or firmware processes executing on a microprocessor within the adapter 200. For example, the elements 225, 220, 215 and 210 may be implemented in a s ingle ASIC. An example of th e bus coup led w ith the DMA 225 is the Peripheral Components Interconnect (Pdn) bus.

The State Memory 210 is shown including 32 Transmit FIFOs 230, 8 Receive Queues 235, a set of Transmit Descriptors 240 and a set of Receive Descriptors 245. The Transmit Descriptors 240 are associated with the 32 Transmit FIFOs 230. Similarly, the Receive Descriptors 245 are associated with the 8 Receive Queues 235. The 8 Receive Queues 235 contain descriptors indicating packets that have been reassembled in the Reassembly Memory 211. Each received packet is first reassembled from cells received from the network through Network interface 205, and then an entry indicating the completely reassembled packet is placed on one of the Receive Queues 235.

In an example embodiment, the Transmit Descriptors 240 are organized and referred to as a Transmit Descriptor Array (TDA) The TDA includes one entry for each of the 32 Transmit FIFOs 230. Each entry in the TDA contains two descriptors, each descriptor containing addressing information regarding a data segment in Host Memory 110 as shown in FIG. 1.

Further in the example embodiment, the Receive Descriptors 245 are organized and referred to as a Receive Descriptor Array (RDA), having one entry for each of the 8 Receive Queues 235. Each entry in the Receive Descriptor Array entry contains 4 descriptors, each descriptor containing addressing information regarding a free space buffer in Host Memory 110.

During operation of the elements shown in FIG. 2, the 32 Transmit FIFOs 230 store data transferred from a host memory, for example Host Memory 110 as shown in FIG. 1. The data stored in the Transmit FIFOs 230 is subsequently transmitted in a 'first in first out basis' onto the network via the Network Interface 205. The Receive Queues 235 are used to store descriptors indicating reassembled packets in the Reassembly Memory 211. Subsequently, the data in the Reassembly Memory 211 indicated by the entries on the Receive Queues 235 is transferred to the host memory.

The specific locations of host memory into which received data is written by the adapter and from which data to be transmitted is read by the adapter are indicated by receive descriptors 245 and transmit descriptors 240 respectively. During operation, the adapter reads transmit descriptors from transmit queues in host memory, and receive descriptors from receive queues (see FIG. 3). Descriptors are read from host memory as they are needed by the adapter. No progress can be made in moving data to or from the network adapter unless the necessary descriptors have first been read from the host memory.

Further during operation of the elements shown in FIG. 1, the DMA Arbiter Logic 220 controls access to the DMA 225 by arbitrating among requests for the DMA 225 issued from the Control Logic 215. The Control Logic 215 is the originator of multiple requests of different types. Examples of requests from the Control Logic 215 are requests to transfer data indicated by the Receive Queues 235 into Host Memory 110 (Receive Data Requests), requests to transfer data from the Host Memory 110 into the Transmit FIFOs 230 (Transmit Data Requests), requests to read a new descriptor from the Host Memory 110 into the TDA 240 (Transmit Descriptor Requests), requests to read a new descriptor from the Host Memory 110 into the RDA 245 (Receive Descriptor Requests), requests to write non-error and maintenance status information to the Host Memory 110 relating to completion of a transmission by the adapter (Transmit Status Requests), requests to write non-error and maintenance status information to the Host Memory 110 relating to receipt of data by the adapter (Receive Status Requests), and/or requests to write error and maintenance status information to the host memory (Error and Maintenance Requests). Each of the previously listed request types requires use of the DMA logic 225 to be completed.

When the I/O Bus 115 becomes available for the DMA 225 to use, the DMA Arbiter logic 220 indicates to the Control Logic 215 which requester will be allowed to use the DMA Arbiter logic 220 to transfer data to or from the host memory via the I/O Bus 115.

Figure 3:
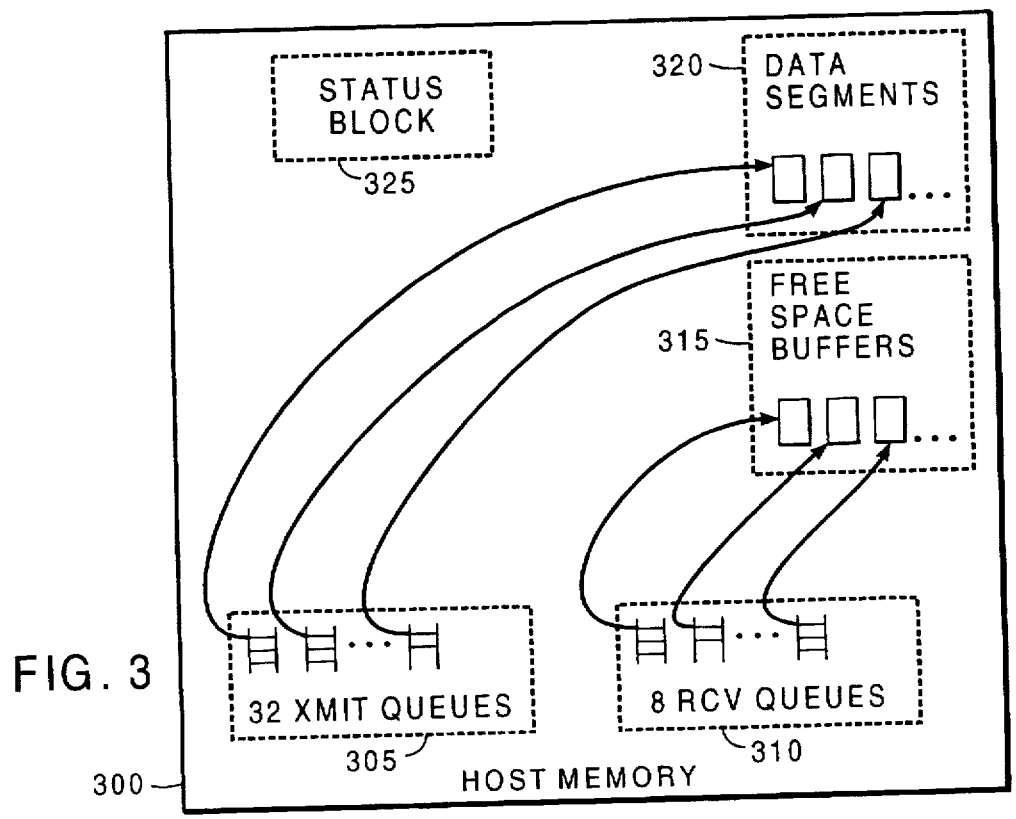
FIG. 3 is a detailed drawing of the elements in an example embodiment of the host memory as shown in FIG. 1.

FIG. 3 is a drawing of elements contained within an example embodiment of the Host Memory 110 as shown in FIG. 1. FIG. 3 shows a Host Memory 300 including Transmit Queues 0–31 305, Receive Queues 0–7 310, a Status Block 325, Free Space Buffers 315, and Data Segments 320. For purposes of example, there are 32 Transmit Queues. Further, for purposes of example, there are 8 Receive Queues. Each of the Transmit Queues 305 is associated with one of the 32 Transmit FIFOs 230 as shown in FIG. 2. Further, each of the 8 Receive Queues 310 is associated with one of the 8 Receive Queues 235 as shown in FIG. 2. Similarly, each of the Transmit Queues 305 is associated with an entry in the TDA 240, and each of the Receive Queues 310 is associated with an entry in the RDA 245.

Each of the 32 Transmit Queues 305 contains zero or more entries known as transmit descriptors. During operation of the adapter 200 as shown in FIG. 2, data is transferred between the Host Memory 300 and the Network 125. Each transmit descriptor indicates a data segment within Data Segments 320 having data which is to be transmitted onto the network.

The Adapter 200 moves transmit descriptors from the 32 Transmit Queues 305 into the TDA 240 as space becomes available in the TDA 240. Space becomes available in the TDA 240 when the adapter has transmitted all of the data contained within a Data Segment indicated by a given Transmit Descriptor stored in an entry within the TDA 240. Upon this occurrence, and when there is another transmit descriptor in the transmit queue within host memory (see element 305 in FIG. 3) associated with that entry in the TDA 240, the control logic 215 in FIG. 1 issues a transmit descriptor request to the DMA Arbiter 220. The DMA Arbiter subsequently grants the request, and the control logic then uses the DMA 225 to transfer the new transmit descriptor from host memory into the TDA 240.

When an entry in the TDA 240 is non-empty, the control logic 215 issues a transmit data request to the DMA Arbiter 220. Subsequently the DMA Arbiter 220 grants the request, and the control logic 215 then uses the DMA 225 to transfer data from a data segment indicated by a transmit descriptor contained in that entry in the TDA 240. When all the data in a data segment indicated by a transmit descriptor in an entry in the TDA 240 has been transmitted or moved from the host memory 300 into a transmit FIFO within the adapter, that transmit descriptor is no longer useful, and the space within the entry in the TDA 240 becomes available to store another transmit descriptor.

Each of the 8 Receive Queues 310 includes zero or more entries known as receive descriptors. Each receive descriptor includes indication of a free space buffer within Free Space Buffers 315, for storage of data received from the network. Each of the 8 Receive Queues 310 contains one or more entries known as receive descriptors. During operation of the adapter 200 as shown in FIG. 2, data is transferred between the Network 125 and the Host Memory 300. Each receive descriptor indicates a free space buffer within Free Space Buffers 315 available to store data which is received from the network.

The Adapter 200 moves receive descriptors from the 8 Receive Queues 310 into the RDA 245 as space becomes available in the RDA 245. Space becomes available in the RDA 245 when the adapter has finished using a Data Segment indicated by a given receive descriptor stored in an entry within the RDA 245. Upon this occurrence, the control logic 215 in FIG. 1 issues a receive descriptor request to the DMA Arbiter 220. The DMA Arbiter subsequently grants the request, and the control logic then uses the DMA 225 to transfer a new receive descriptor from host memory, into the RDA 245.

When an entry in the RDA 245 is non-empty, and a packet has been received and reassembled in the receive queue within the Reassembly Memory 211 associated with the entry, the control logic 215 issues a receive data request to the DMA Arbiter 220. Subsequently the DMA Arbiter 220 grants the request, and the control logic 215 then uses the DMA 225 to transfer data indicated by an entry on one of the receive Queues 235 into one of Free Space Buffers 315 indicated by a receive descriptor contained in that entry in the RDA 245. When all the data for a free space buffer indicated by a receive descriptor in the RDA 245 has been transferred from the Reassembly Memory into host memory, that receive descriptor has been consumed, and the space within the entry in the RDA 245 becomes available to store another receive descriptor.

The Status Block 325 includes pointers to entries in the Transmit Queues 305 and the Receive Queues 310 indicating the position of the consumer and the producer indices for each one of these queues. The host computer system produces buffers, and is therefore the producer, providing Data Segments and Free Space Buffers which are consumed by the adapter. The host computer system maintains a producer index for each queue in host memory. The adapter maintains its position in each of the queues in host memory with a consumer index. In order to synchronize the producer and consumer, the adapter writes its consumer index for each queue into the Status Block 325 in response to certain predetermined events. When the adapter desires to write a consumer index into the Status Block 325, the Control Logic 215 generates either a transmit status request (if the consumer index is for one of the Transmit Queues 305), or a receive status request (if the consumer index is for one of the Transmit Queues 305). Subsequently the DMA Arbiter 220 grants the request, and the Control Logic 215 uses the DMA 225 to write the consumer index into the Status Block 325. Each time a transmit status request or receive status request is granted, the Control Logic 215 also writes any current error and maintenance information into the host memory. In this way, error and maintenance status updates are piggybacked onto non-error and maintenance status updates.

FIG. 4 is a detailed drawing of an example embodiment of the DMA arbiter 220 as shown in FIG. 2. FIG. 4 shows a three stage arbitration system for controlling access to a shared resource, for example DMA 225. FIG. 4 shows a first stage of arbitration 400, coupled with a second stage of arbitration 402, which is further coupled with a third stage of arbitration 404. In FIG. 4, "request processing" is indicated as proceeding from left to right, while "grant processing" is shown going from right to left.

The request processing inputs to stage one 400 are transmit data requests 0–31 406, transmit descriptor requests 0–31 408, receive data requests 0–7 410, and receive descriptor requests 0–7 412. For purposes of example, all requests are implemented as a binary logic signal that is asserted when a specific request is present, and unasserted when that request is not present. In the example embodiment of FIG. 4, a request by the Control Logic 215 to read data from a data segment indicated by a transmit descriptor within the TDA entry associated with transmit queue 0 causes assertion of transmit data request (0) within transmit data requests 0–31 406. When the DMA Arbiter 220 subsequently grants that request, the Control Logic 215 uses the DMA 225 to transfer data from that data segment into the one of Transmit FIFOs 230 associated with transmit queue (0). Further, for example, a request by the Control Logic 215 to obtain a new descriptor from one of the host transmit queues would be indicated by assertion of one of the 32 possible transmit descriptor requests 408.

Also for example, a request by the Control Logic 215 to write data to a free space buffer indicated by a receive descriptor within the RDA entry associated with Receive Queue 0 in host memory causes assertion of receive data request (0) within receive data requests 0–7 410. When the DMA Arbiter 220 subsequently grants that request, the Control Logic 215 uses the DMA 225 to transfer data to that free space buffer from the Reassembly Memory indicated by an entry on the one of Receive Queues 235 associated with Receive Queue 0 in Host Memory.

Similarly for example, a request by the Control Logic 215 to obtain a new transmit or receive descriptor from one of the host transmit or receive queues is be indicated by assertion of the corresponding one of either the transmit descriptor requests 408 or receive descriptor requests 412.

The request processing outputs from stage one of the arbitration 400 are transmit data high (Xmit_Data_H) 414, transmit data low (Xmit_Data_L) 416, transmit descriptor high (Xmit_Data_H) 418, transmit descriptor low (Xmit_Desc_L) 420. Further outputs from stage one of the arbitration 400, include receive data high (Rcv_Data_H) 422, receive data low (Rcv_Data_L) 424, receive descriptor high (Rcv_Desc_H) 426, and receive descriptor low (Rcv_Desc_L) 428. The request processing outputs from stage one 400 of the arbitration are request processing inputs into stage two 402 of the arbitration.

Transmit data high 414 output from stage one 400 of the arbitration, indicates that a transmit data request was selected by arbitration stage 1 having a high priority. Similarly, transmit data low 416 output from stage one of the arbitration 400 indicates that a selected transmit data request is of low priority. Also, transmit descriptor high 418 output form stage one 400 of the arbitration indicates that a selected transmit descriptor request 408 is of high priority, and transmit descriptor low indicates that a selected transmit descriptor request 408 is of low priority. When transmit data high 414 is asserted, transmit data low 416 is not asserted. Also, when transmit descriptor high 418 is asserted, transmit descriptor low 420 is not asserted. Thus, a selected request will be of either high priority or low priority. The same mutually exclusive relationship holds true for receive data high 422 and receive data low 424, as well as receive descriptor high 426 and receive descriptor low 428. Specifically, if receive data high 422 is asserted, receive data low 424 is not asserted and vice versa. And finally, if receive descriptor high 426 is asserted then receive descriptor low 428 is not asserted and vice versa.

Stage 2 of the arbitration 402 further has two other request processing inputs, specifically Transmit Status (Xmit_Status) 430, and Receive Status (Rcv_Status) 432. The request signal Transmit Status 430 indicates a request by the Control Logic 215 for the DMA 225 to write non-error and maintenance status information into the Status Block 325, for example the current value of a consumer index maintained by the adapter indicating the last entry processed by the adapter within one of the transmit queues 305. The request signal Receive Status 430 indicates a request by the Control Logic 215 for the DMA 225 to write non-error and maintenance status information into the Status Block 325, for example the current value of a consumer index maintained by the adapter indicating the last entry processed by the adapter within one of the receive queues 310.

The request processing outputs from stage two 402 of the arbitration as shown in FIG. 4 are Transmit DMA High (Xmit_DMA_H) 434, Transmit DMA Low (Xmit_DMA_L) 436, Receive DMA High (Rcv_DMA_H) 438, and Receive DMA Low (Rcv_DMA_L) 440. These outputs from stage two of the arbitration 402 are multiply coupled with request processing inputs to stage three 404 of the arbitration as follows: Transmit DMA High 434 is coupled with input 442 and input 446 of stage three 404. Transmit DMA Low 436 is coupled with input 450 and input 454. Receive DMA High is coupled with input 452 and input 444, and Receive DMA Low is coupled with input 456 and input 448 of stage three. As with the outputs of stage one 400, the outputs of stage two 402 will indicate the mutually exclusive priority of selected inputs from stage 2 402. Specifically, if Transmit DMA High 434 is true then Transmit DMA Low 436 is not true, and if Receive DMA High 438 is true then receive DMA Low 440 is not true and vice versa. Stage three of the arbitration 404 further includes an Error and Maintenance Status update Request (E_M_Request) input 470, that is asserted when the Error and Maintenance Logic 471 (for example contained within Control Logic 215 as shown in FIG. 2) requests the DMA 225 to write error and maintenance information to the Status Block 325 in Host Memory 300 as shown in FIG. 3.

Example error and maintenance information is information regarding utilization of resources within the network adapter.

Stage three of the arbitration 404 is shown consisting of three logic blocks 405, 466, and 468. Signals generated during request processing by stage three of the arbitration 404 are shown as: Transmit Request Present (Xmit) 458, Receive Request Present (Rcv) 460, Normal Request Present (Norm_Req) 462, Normal Request Selected (Norm_Selected) 464 and Error and Maintenance Status Update Request Selected (E_M_Req_Sel) 467.

The signal Normal Request Selected 464 is an input into AND gate 473. The signal DMA Logic Available 469 is a further input into AND gate 473. DMA Logic Available 469, when asserted, indicates that the DMA 225 is available to service one of the requests passed to the DMA Arbiter 220. The Grant Processing Trigger output 474 of AND gate 473 feeds back into logic block 405, and triggers the "grant processing" (shown going from right to left in FIG. 4) logic of the elements shown in FIG. 4.

DMA Logic Available 469 is also an input into AND gate 472. A further input into AND gate 472 is Error and Maintenance Status Update Request Selected 467. The output of AND gate 472 is Error and Maintenance Status Update Request Granted signal 499 fed back into Error and Maintenance Logic 471. When the Error and Maintenance Logic 471 detects that Error and Maintenance Status Update Request Granted signal 499 is asserted, it then uses the DMA 225 to write error and maintenance information into the Status Block 325 as shown in FIG. 3.

During request processing operation of the third stage of arbitration 404, the signal Xmit 458 is asserted if either signal Xmit_DMA_H or the signal Xmit_DMA L is asserted. Also, the signal Rcv 460 is asserted if either the signal Rcv_DMA_H or Rcv_DMA_L is asserted. The logic block 46,6 then asserts the signal Normal Request 462 if either the signal Xmit 458 or the signal Rcv 460 is asserted. The logic block 468 asserts the signal Error and Maintenance Status Update Request Selected 467 if the Error and Maintenance Status Update Request signal 470 is asserted and the Normal Request signal 462 is not asserted. If the Normal Request signal 462 is asserted, then the logic block 468 asserts the Non normal Request Selected signal 464.

Figure 5:
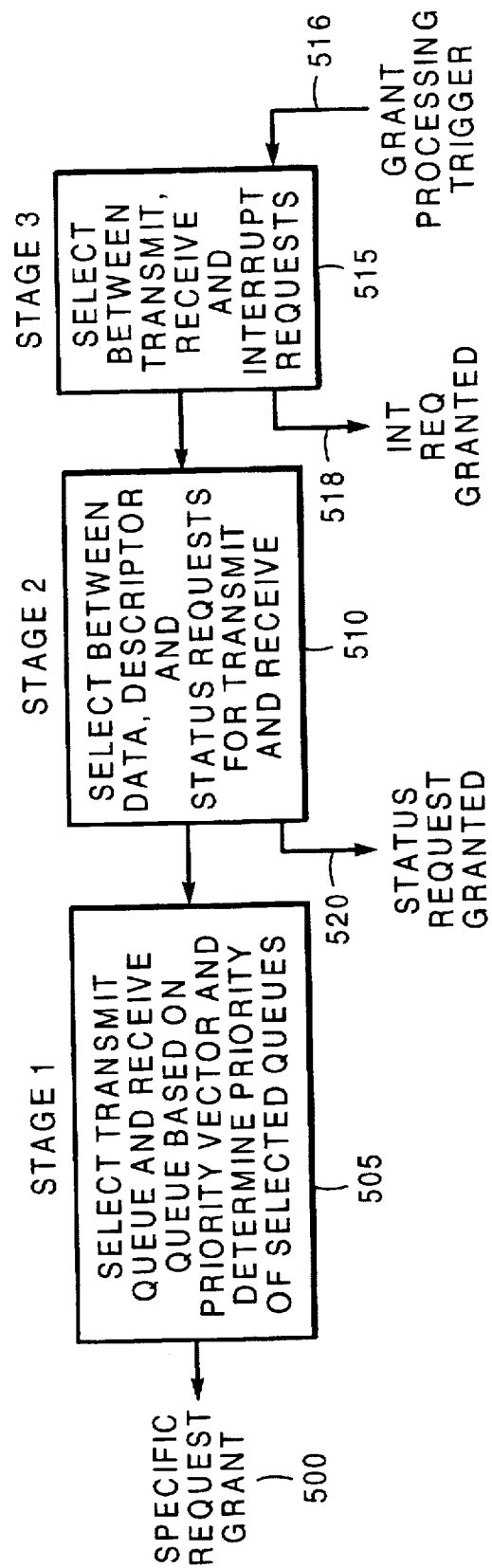
FIG. 5 is a flow chart describing an example embodiment of grant processing in the three stages of arbitration as shown in FIG. 4.

FIG. 5 is a flow chart showing an example embodiment of the grant processing operation of the three arbitration stages shown in FIG. 4. The Grant Processing Trigger 516 is the same as Grant Processing Trigger output 474 in FIG. 4. The flow of processing in FIG. 5 is from right to left.

In stage three 515 of the arbitration, as shown in FIG. 4, the DMA Arbiter 220 selects between transmit, receive, and error and maintenance status update requests. If an error and maintenance status update request is granted, that is indicated by Error and Maintenance Status Update Request Granted signal 518.

Error and Maintenance Status Update Request Granted signal 518 corresponds with Error and Maintenance Status Update Request Granted 499 in FIG. 4. If an error and maintenance status update request is not granted, then stage 3 515 is followed by Stage 2 510.

In Stage 2 510 the DMA Arbiter 220 selects between data, descriptor and non-error and maintenance status requests. If a non-error and maintenance status request is granted, that is indicated by Status Request Granted 520. Status Request Granted 520 corresponds with Transmit Status Grant 482 and Receive Status Grant 481 shown in FIG. 4. If a status request is not granted, then Stage 2 510 is followed by Stage 1 505.

In Stage 1 505, the DMA Arbiter 220 selects between individual transmit or receive data or descriptor requests. The output of grant processing in Stage 1 505 is a grant 500 of a specific request to one of the request inputs to Stage 1 of the arbitration 400 as shown in FIG. 4. The grant 500 consists of the signals labeled 486, 485, 484 and 483 as shown in FIG. 4.

Figure 6:
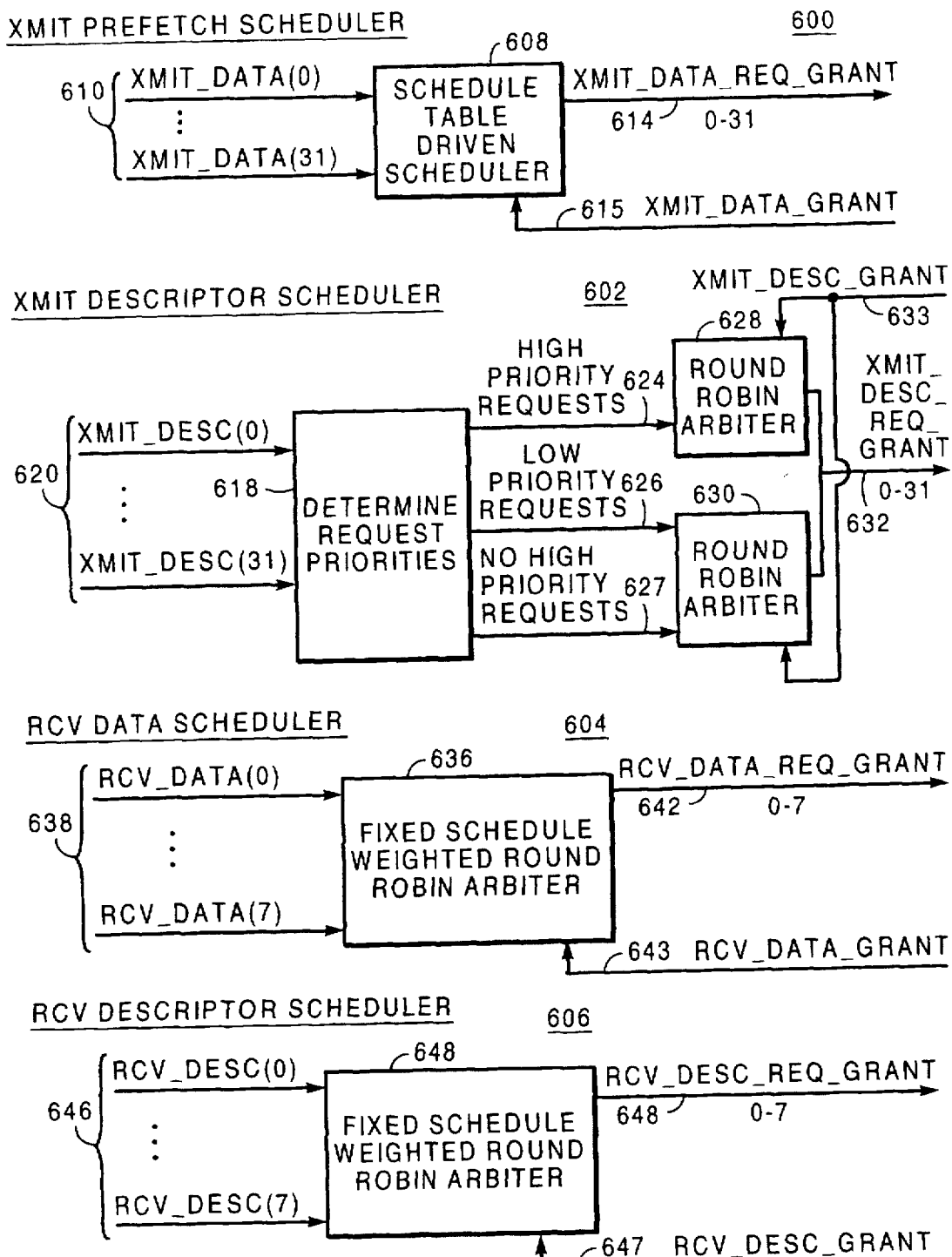
FIG. 6 is a detailed drawing of the elements in an example embodiment of grant processing logic in the first stage of arbitration as shown in FIG. 4.

FIG. 6 is a detailed drawing of the grant processing logic elements within an example embodiment of the Stage 1 of the arbitration 400 as shown in FIG. 4 as element 400. The grant processing logic shown in FIG. 6 consists of four separate arbiters. The four arbiters are the Transmit Data Scheduler 600 for transmit data requests, the Transmit Descriptor Scheduler 602 for transmit descriptor requests, the Receive Data Scheduler 604 for receive data requests, and the Receive Descriptor Scheduler 606 for receive descriptor requests.

The Transmit Data Scheduler 600 is triggered by the signal Xmit Data Grant 615, which corresponds with the signal Xmit__Data__Grant 477 as shown in FIG. 4. The Transmit Data Scheduler 600 uses a combination of thresholding and dynamic priority to select one of the currently asserted transmit data requests 610 having the highest cumulative priority. The transmit data requests 610 in FIG. 6 consist of the transmit data requests 406 as shown in FIG. 4.

Figures 8, 9:
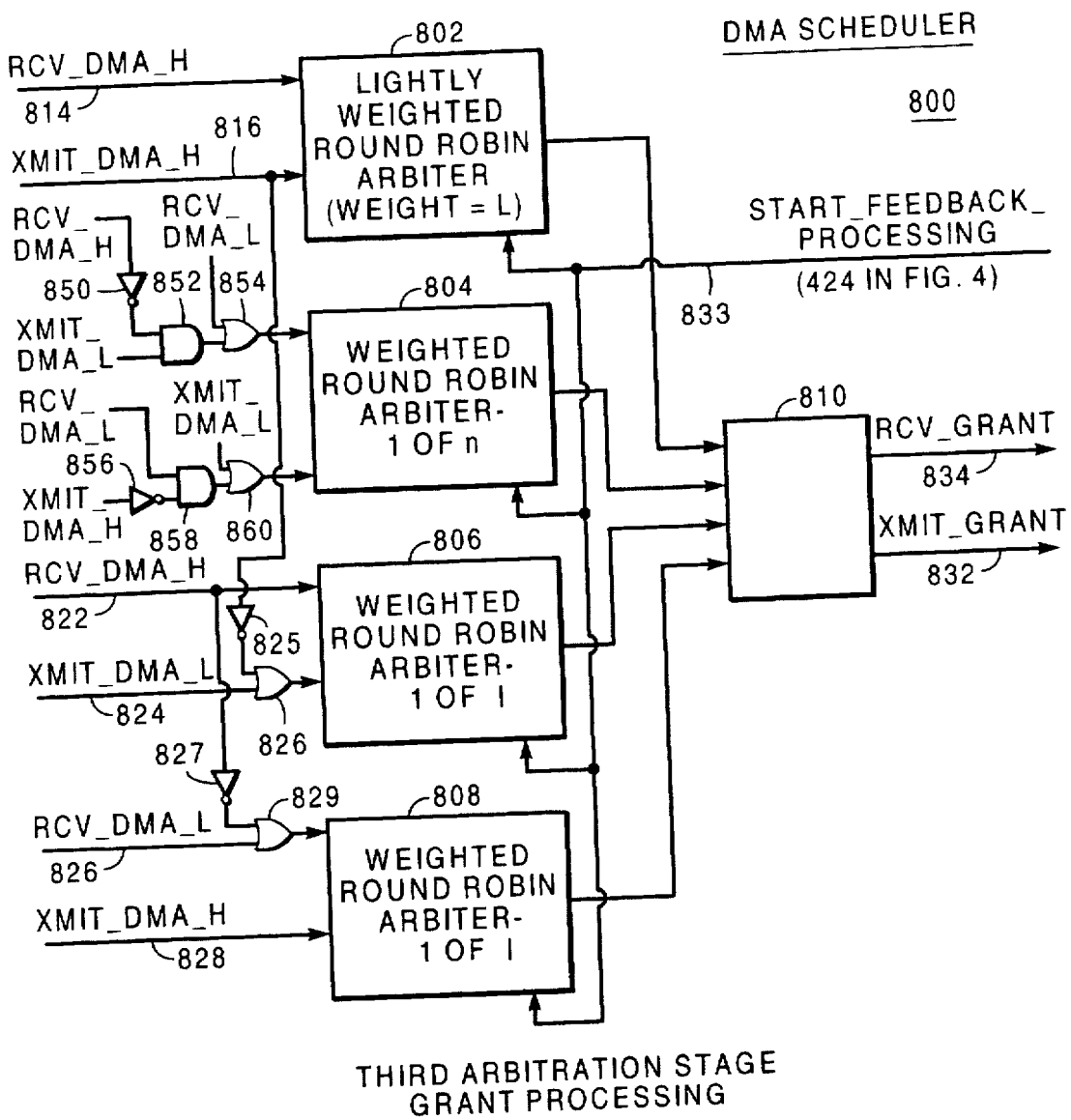
FIG. 8 is a detailed drawing of an example embodiment of grant processing logic in the third stage of arbitration as shown in FIG. 4.
FIG. 9 is a drawing of an example embodiment of a priority vector generated during grant processing by stage one of the arbitration as shown in FIG. 4.

During operation of the elements shown in FIG. 6, the Transmit Data Scheduler 600 accesses the Schedule Table 250, and other data in the State Memory 210, through the Control Logic 215 in order to create a Priority Vector, the format of which is shown in FIG. 9. A Priority Vector is created for each currently asserted Transmit Data Request. The Transmit Data Request having the Priority Vector with the highest value is selected by the Schedule Table Driven Scheduler, and then a corresponding grant signal in Xmit__Data_Request__Grant signals 0–31 614 is asserted. For purposes of example, the Xmit__Data__Request__Grant signals 0–31 are individual binary logic lines coupled with the Control Logic 215. When Xmit__Data_Request__Grant signal 0 is asserted, that informs the Control Logic 215 that a transmit data request 0 has been granted by the DMA Arbiter 220.

The Transmit Descriptor Scheduler 602 is triggered by the assertion of Xmit__Desc__Grant signal 633. The logic block 618 determines the priorities of each one of transmit descriptor requests 0–31 620. Transmit descriptor requests are issued when there is room for a new transmit descriptor to be stored in an entry within the TDA 240 as shown in FIG. 2. A transmit descriptor request is high priority when the FIFO corresponding with that request is below a predetermined level. Otherwise, the priority of a transmit descriptor request is low priority. The logic block 618 then sends the high priority transmit descriptor requests 624 to round robin arbiter 628, and the low priority transmit descriptor requests 626 to the round robin arbiter 630. If there are no high priority transmit descriptor requests, the signal 627 is asserted to the round robin arbiter 630.

When the Xmit__Desc__Grant signal 633 is asserted, then the round robin arbiter 628 selects from those high priority transmit descriptor requests 624 on a round robin basis. The selected high priority transmit descriptor request is then granted access to the shared resource, which is indicated by asserting the corresponding one of Xmit__Desc-Req__Grant signals 632, which correspond with Xmit__Desc__Req__Grant signals 0–31 0721 483 in FIG. 4.

When the Xmit__Desc__Grant signal 633 is present, and the signal 627 indicates that there are no high priority transmit descriptor requests, then round robin arbiter 630 selects from the low priority transmit descriptor requests on a round robin basis. The selected low priority transmit descriptor request is then indicated by asserting the corresponding one of Xmit__Desc__Req__Grant signals. 632, which correspond with Xmit__Desc-Req__Grant signals 0–31 in FIG. 4.

The Receive Data Scheduler 604 consists of a Fixed Schedule Weighted Round Robin Arbiter 636, having inputs of Receive Data Requests 0–7 638, and triggered by Rcv__ Data__Grant 643. Receive Data Requests 0–7 638 correspond with Receive Data Requests 0–7 410 as shown in FIG. 4, and Rcv-Data-Grant 643 corresponds with Receive Data Grant 479. The Arbiter 636 uses a weighted roundrobin scheduling scheme. For example the following schedule is used to select between Receive Data Requests 0–7:

0 1 2 3 0 1 2 4 0 1 2 5 0 1 2 6 0 1 2 7 - - - The above schedule weights arbitration in favor of Receive Data Requests 0, 1 and 2, as compared with Receive Data Requests 3, 4, 5, 6 and 7, by the ratio of 5:1. The selected one of Receive Data Requests 638 is then indicated by asserting the corresponding one of Receive Data Request Grant Signals 642. The Receive Data Request Grant Signals 642 correspond with Receive Data Request Grant Signals 0–7 484 as shown in FIG. 4.

The Receive Descriptor Scheduler 606 is triggered by the assertion of Rcv__Desc__Grant 647, which corresponds with the Rcv__Desc__Grant signal 480 as shown in FIG. 4. When the Rcv__Desc__Grant 647 is asserted, the Fixed Schedule Weighted Round Robin Arbiter 648 uses the same fixed schedule weighted round robin arbitration scheme as the Receive Data Scheduler 604 to select between those Receive Descriptor Requests 646 (corresponding with Receive Descriptor Requests 412 in FIG. 4) that are present. The selected one of Receive Descriptor Requests 646 is then indicated by asserting the corresponding one of Rcv__Desc__ Req__Grant signals 0–7 649, which correspond with the Rcv__Desc__Req__Grant 0–7 signals 483 as shown in FIG. 4.

Figure 7:
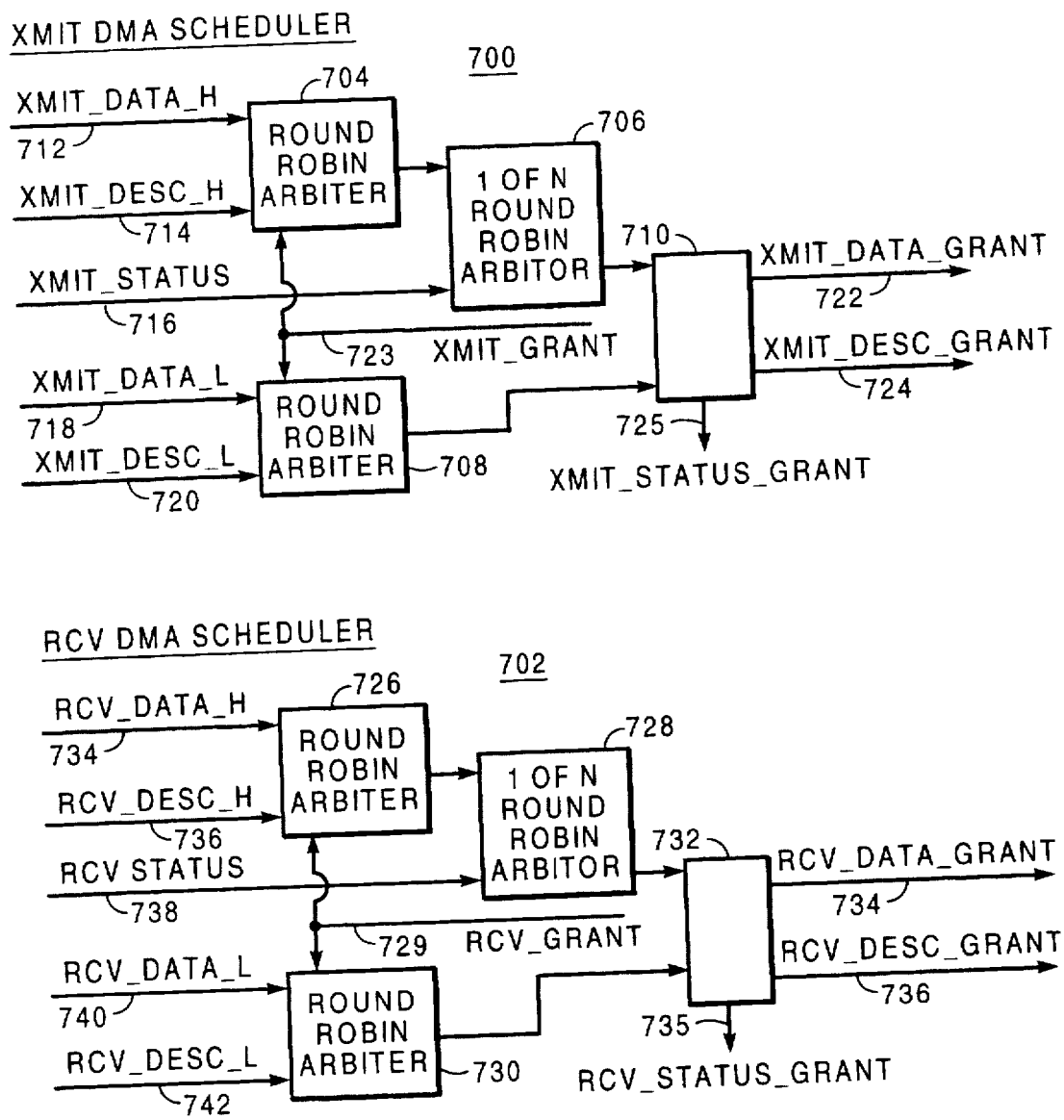
FIG. 7 is a detailed drawing of the elements in an example embodiment of grant processing logic in the second stage of arbitration as shown in FIG. 4.

FIG. 7 is a drawing of an example embodiment of the grant processing logic in the second arbitration stage. Shown in FIG. 7 is a Transmit DMA Scheduler 700. The Transmit DMA Scheduler 700 is shown having a Round Robin Arbiter 704 coupled with a 1 of N Round Robin Arbiter 706. The 1 of N Round Robin Arbiter 706 is further coupled with a Logic Block 710. Transmit DMA Scheduler 700 further includes Round Robin Arbiter 708 which is also coupled with the Logic Block 710.

Inputs to the Round Robin Arbiter 704 are Transmit Data High signal 712 and Transmit Descriptor High signal 714. A further input to the Round Robin Arbiter 704 is Transmit Grant signal 723. The output of Round Robin Arbiter 704 is an input into the 1 of N Round Robin Arbiter 706. A further input to the 1 of N Round Robin Arbiter 706 is a Transmit Status signal 716. The output of the 1 of N Round Robin Arbiter 706, is input into Logic Block 710. Inputs into Round Robin Arbiter 708 are Transmit Data Low signal 718, Transmit Descriptor Low signal 720 and Transmit Grant signal 723. The output of Round Robin Arbiter 708 is input into the Logic Block 710. The outputs of the Logic Block 710 are Transmit Data Grant signal 722, Transmit Descriptor Grant 724 and Transmit Status grant 725.

Logic is included in the Transmit DMA Scheduler 700 so that only one of the Round Robin Arbiters 704 or 708 is triggered each time a Transmit Grant signal 723 is provided. If neither the High or Low Signal for Data (Transmit DMA High 712 or Transmit DMA Low 718) are active, then for the purposes of triggering one of the Round Robin Arbiters 704 or 708, the logic provided ensures that the appropriate Round Robin Arbiter is triggered based on the Transmit Descriptor High or Transmit Descriptor Low signal being active. Similar logic is used if both the Transmit Descriptor High and Transmit Descriptor Low signal are not asserted. An example of the logic for selecting a particular arbiter to be triggered is shown in FIG. 8 and is explained in greater detail below.

The Transmit DMA Scheduler 700 is for example contained within stage two of the arbitration logic 402 shown in FIG. 4. Further, for example, the Transmit Data High signal 712 corresponds with Transmit Data High 414 as shown in FIG. 4. The Transmit Descriptor High signal 714 corresponds with the Transmit Descriptor High signal 418 as shown in FIG. 4. The Transmit Status signal 716 corresponds with the Transmit Status signal 430 as shown in FIG. 4. Further, the Transmit Data Low signal 718 corresponds with the Transmit Data Low signal 416 in FIG. 4 and the Transmit Descriptor Low signal 720 corresponds with the Transmit Descriptor Low signal 420 in FIG. 4. The Transmit Grant signal 723 in FIG. 7 corresponds with the Transmit Grant signal 475 as shown in FIG. 4. Also the Transmit Data Grant signal 722 corresponds with the Transmit Data Grant signal 477 in FIG. 4 and the Transmit Descriptor Grant signal 724 corresponds with the Transmit Descriptor Grant signal 478 in FIG. 4. The Transmit Status Grant signal 725 in FIG. 7 corresponds with the Transmit Status Grant signal 482 as shown in FIG. 4.

During operation of the elements shown in the transmit DMA Scheduler 700 of FIG. 7, the Round Robin Arbiter 704 and Round Robin arbiter 708 are triggered by the Transmit Grant signal 723. The Transmit grant signal 723 is received from the third stage of arbitration. Upon receipt of the Transmit Grant signal 723 the Round Robin Arbiter 704 selects between Transmit Data High 712 and Transmit Descriptor High 714 based on an evenly weighted round robin scheduling system. The selected one of Transmit Data High 712 or Transmit Descriptor High 714 is then passed to the 1 of N Round Robin Arbiter 706, as well as the transmit status signal 716.

The 1 of N Round Robin Arbiter 706 then selects between the output of Round Robin Arbiter 704 and Transmit Status signal 716 based on a heavily weighted one of N round robin arbiter system, in which the Transmit Status Signal 716 is selected once out of every 32 passes. The output of 1 of N Round Robin Arbiter 706 then passes to Logic Block 710.

The input signals Transmit Data Low 718 and Transmit Descriptor low 720 feed into Round Robin Arbiter 708 during operation. Round Robin Arbiter 708 is triggered into operation by Transmit Grant signal 723. Round Robin Arbiter 708 selects between Transmit Data Low signal 718 and Transmit Descriptor Low signal 720 on an evenly weighted round robin basis. The output of Round Robin Arbiter 708 feeds into the Logic Block 710. The Logic Block 710 selects between the output from 1 of N Round Robin Arbiter 706 and the output from Round Robin Arbiter 708.

The Logic Block 710 will select the high priority signal from 1 of N round Robin Arbiter 706 if it is present. If no high priority signal is present, the Logic Block 710 selects the signal. from Round Robin Arbiter 708. When the output from 1 of N Round Robin Arbiter 706 is Transmit Status signal 716 then the output from Logic Block 710 is the assertion of Transmit Status Grant signal 725. If the output of 1 of N Round Robin Arbiter 706 is Transmit Data High 712, then the Logic Block 710 will assert Transmit Data Grant 722. If the output of 1 of N Round Robin Arbiter 706 is Transmit Descriptor High 714, then the output of the Logic Block 710 will be equal to Transmit Descriptor Grant signal 724.

If there is no output from 1 of N Round Robin Arbiter 706 into Logic Block 710, then if the output of Round Robin Arbiter 708 is Transmit Data Low 718, then the output of the Logic Block 710 is Transmit Data Grant 722. Similarly, if there is no output from 1 of N Round Robin Arbiter 706, and the output of Round Robin Arbiter 708 is Transmit Descriptor Low 720, then the output of the Logic Block 710 is Transmit Descriptor Grant signal 724.

Thus, it is shown that transmit DMA Scheduler 700 arbitrates simultaneously between transmit data, transmit descriptor, and transmit status requests upon receipt of the transmit grant signal 723. The transmit DMA Scheduler 700 may be implemented for example using three round robin pointers, one each for the arbiters 704, 706 and 708. The disclosed system thereby implements a simple,. round robin arbitration between both high and low priority transmit data and transmit descriptor requests. In this way, the low priority round robin pointer selects among low priority requests, and high priority pointer selects among high priority requests.

As described above, transmit status update requests have a single priority level. A 1 of N round robin arbiter is used to choose between a high priority data or descriptor request and a transmit status update request. For example, for every N high priority transmit data or transmit descriptor requests, a single transmit status update request will be selected. In the example embodiment, "N" is programmable to be between 1 and 255.

Further shown in FIG. 7 is Receive DMA Scheduler 702. The Receive DMA Scheduler 702 is contained within the second arbitration stage 402 as shown in FIG. 4. The Receive DMA Scheduler 702 is grant processing logic. The example embodiment of the Receive DMA Scheduler 702 shown in FIG. 7 includes Round Robin Arbiter 726, coupled with 1 of N Round Robin Arbiter 728, which is further coupled with Logic Block 732. Also shown in Receive DMA Scheduler 702 is Round Robin Arbiter 730 which is also coupled with Logic Block 732. The inputs to Round Robin Arbiter 726 are Receive Data High signal 734 and Receive Descriptor High signal 736. The output of Round Robin Arbiter 726 feeds into 1 of N round Robin Arbiter 728. A further input into 1 of N Round Robin Arbiter 728 is Receive Status signal 738. The output of 1 of N Round Robin Arbiter 728 is input into the Logic Block 732.

A similar logic is included to select between Round Robin Arbiters 726 and 730 so that only one of them is triggered each time a receive grant signal 729 is received as was described for the Xmit DMA Scheduler 700. An example of this logic is shown in FIG. 8 and is explained in greater detail below.

The inputs into Round Robin Arbiter 730 are Receive Data Low signal 740 and Receive Descriptor Low signal 742. The output of Round Robin Arbiter 730 is input into the Logic Block 732. Both Round Robin Arbiter 726 and Round Robin Arbiter 730 are triggered by assertion of Receive Grant signal 729. The outputs of Logic Block 732 are Receive Data Grant signal 734, Receive Descriptor Grant signal 736, and Receive Status Grant signal 735.

The receive DMA Scheduler 702 is for purposes of example contained within stage 2 of the arbitration shown as element 402 in FIG. 4. Receive Data High signal 734 corresponds with Receive Data High signal 422 in FIG. 4. Receive Descriptor High signal 736 corresponds with Receive Descriptor High signal 426. Receive Status signal 738 corresponds with Receive Status signal 432 in FIG. 4.

Receive Data Low signal 740 corresponds with Receive Data Low signal 424. And Receive Descriptor Low signal 742 corresponds with Receive Descriptor Low signal 428. Further, Receive Grant signal 729 corresponds with Receive Grant signal 476. Receive Data Grant signal 734 corresponds with Receive Data Grant signal 479 and Receive Descriptor Grant signal 736 corresponds with Receive Descriptor Grant signal 480. Finally, Receive Status Grant signal 735 corresponds with Receive Status Grant signal 481 in FIG. 4.

During operation of the example embodiment of the Receive DMA Scheduler 702 shown in FIG. 7, the Round Robin Arbiter 706 selects on a round robin basis between the signals Receive Data High 734 and Receive Descriptor High 736. The output of the Round Robin Arbiter 726 feeds into 1 of N Round Robin Arbiter 728 along with the Receive Status signal 738. The 1 of N Round Robin Arbiter 728 applies a weighted round robin arbitration system to its inputs. The selected output then feeds into the Logic Block 732. The Round Robin arbiter 730 applies a simple round robin arbitration system to the inputs Receive Data Low 740 and Receive Descriptor Low 742.

The selected one of the inputs to Round Robin Arbiter 730 is then fed into the Logic Block 732. The Logic Block 732 then selects one of its input signals based on whatever signal has a high priority. For example, if the output of 1 of N Round Robin Arbiter is Receive Status signal 738, then the output of the Logic Block 732 is Receive Status grant signal 735. Thus, Receive Status Grant 735 will be asserted whenever the output of 1 of N Round Robin Arbiter 728 is Receive Status signal 738.

If the output of 1 of N Round Robin Arbiter 728 is Receive Data High signal 734 then the output of the Logic Block 732 is Receive Data Grant signal 734. If the output of 1 of N Round Robin Arbiter 728 is Receive Descriptor High 736, then the output of the Logic Block 732 is Receive Descriptor Grant signal 736.

If there is no output from 1 of N Round Robin Arbiter 728 and there is output from Round Robin Arbiter 730 then the output of Round Robin Arbiter 730 will determine the output of the Logic Block 732. For example, if the output of Round Robin Arbiter 730 is Receive Data Low signal 740 and there is no output from 1 of N Round Robin Arbiter 728, then the output of Logic Block 732 is Receive Data Grant signal 734. Similarly, if the output of Round Robin Arbiter 730 is Receive Descriptor Low signal 742 and there is no output from 1 of N Round Robin Arbiter 728, then the output of Logic Block 732 is Receive Descriptor Grant signal 736.

In this way the Receive DMA Scheduler 702 arbitrates between receive data, receive descriptor, and receive status update requests. It is identical in functionality to the transmit DMA Scheduler 700. Note, however, that the Receive DMA Scheduler 702 and the Transmit DMA Scheduler 700 may have different values of N for the one of N arbitration between high priority data or descriptor requests and non-error and maintenance status update requests.

FIG. 8 is an example embodiment of the grant processing logic within the third arbitration stage. FIG. 8 shows a DMA Scheduler 800, as for example would be contained within the stage three arbitration logic 404 ads shown in FIG. 4. The DMA Scheduler 800 as shown in FIG. 8, includes a Lightly Weighted Round Robin Arbiter 802, a Weighted Round Robin Arbiter 804, a Weighted Round Robin Arbiter 806, and a Weighted Round Robin Arbiter 808. The outputs from these four round robin arbiters are inputs into Logic Block 810.

The triggering inputs to Lightly Weighted Round Robin Arbiter 802 are Receive DMA high signal 814 and Transmit DMA High signal 816. The triggering inputs to Weighted Round Robin Arbiter 804 are the outputs of OR gate 854 and OR gate 860. The inputs to OR gate 854 are Receive DMA Low signal 818 and the output of AND gate 852. The inputs to AND gate 852 are Transmit DMA Low signal 820 and the inverted Receive DMA High signal 814. The inputs to OR gate 860 are Transmit DMA Low signal 820 and the output of AND gate 858. The inputs to AND gate 858 are Receive DMA Low signal 818 and the inverted Transmit DMA High signal 816.

The triggering inputs to Weighted Round Robin Arbiter 806 are Receive DMA High signal 822 and the output of OR gate 826. The inputs to OR gate 826 are the inversion of Transmit DMA High signal 816, and Transmit DMA Low signal 824. The triggering inputs to Weighted Round Robin Arbiter 808 are Transmit DMA signal 828, and the output of OR gate 829, which has as inputs the inversion of Receive DMA High signal 822, and Receive DMA Low signal 826. All of the round robin arbiters in the DMA Scheduler 800 are triggered by the Start Feedback Processing signal 833, as well as both of their triggering input signals being asserted.

The triggering inputs for the four arbiters enable at most one of the arbiters at any one time. The inputs subject to the described arbitration within the arbiters are the signals RCV_DMA_H 814 and XMIT_DMA_H 816 for 802, XMIT_DMA_L 820 and RCV_DMA_L 826 for 804, RCV_DMA_H 822 and XMIT_DMA_L 824 for 806, and RCV_DMA L 826 and XMIT_DMA_H 828 for 808.

The Receive DMA High signal 814 corresponds with the Receive DMA High signal 438 as shown in FIG. 4. Similarly, the Transmit DMA High signal 816 corresponds with Transmit DMA High signal 434. Receive DMA Low signal 818 corresponds with Receive DMA Low signal 440. Transmit DMA Low 820 corresponds with Transmit DMA Low signal 436. Receive DMA High signal 822 corresponds with Receive DMA High signal 438. Also, Start Feedback Processing signal 833 corresponds with Grant Processing Trigger signal 474 as shown in FIG. 4. The Receive Grant signal 834 corresponds with the Receive Grant signal 476 in FIG. 4 and the Transmit Grant signal 832 corresponds with the Transmit Grant signal 474.

During operation of the elements shown in the example embodiment of DMA Scheduler 800, each of the round robin arbiters 802, 804, 806 and 808, is triggered by the Start Feedback Processing signal 833 and both corresponding input signals. The Lightly Weighted Round Robin Arbiter 802 selects between its input signals based on a round robin system, with the exception that every predetermined number of cycles, where the predetermined number equals L, one of the two input signals is forced to be successful. The number of cycles L is programmable. Each time Start Feedback Processing signal 833 is asserted and both RCV_DMA_H 814 and XMIT_DMA_H 816 are also asserted is one cycle for Lightly Weighted Round Robin Arbiter 802. Which input signal is favored each L cycles is determined by the setting of a bit in a control register in the DMA Arbiter 220 as shown in FIG. 2.

The Weighted Round Robin Arbiter 804 implements a one of M round robin scheduling scheme, favoring the input signal Received DMA low. The Weighted Round Robin Arbiter 804 allows the Receive DMA Low signal 818 to be output once each M cycles. Each time Start Feedback Processing signal 833 is asserted and both output of OR gate 854 and output of OR gate 860 are also asserted is one cycle for Weighted Round Robin Arbiter 804. The value of M is programmable.

The Weighted Round Robin Arbiter 806, implements a weighted round robin system where the input signal Receive DMA High 822 is favored. Each time Start Feedback Processing 833 is asserted, RCV_DMA_H and the output of OR gate 826 are all asserted is one cycle for Weighted Round Robin Arbiter 806. The output of the OR gate 826 is selected once every I cycles.

The Weighted Round Robin Arbiter 808, similarly favors Transmit DMA High input 828, selecting the output of OR gate 829 once every J cycles. Each time Start Feedback Processing 833, and both XMIT_DMA_H 828 and the output of OR gate 829 are all asserted is one cycle for Weighted Round Robin Arbiter 808.

The outputs selected by the Round Robin Arbiters 802, 804, 806 and 808, are fed into the Logic Block 810. The Logic Block 810 select whichever signal has highest priority from its input signals. For example, if Receive DMA High 814 is input into Logic Block 810 then Receive Grant 834 is asserted. Alternatively, if Transmit DMA High 816 is input into Logic Block 810, Transmit Grant Signal 832 is asserted.

The DMA Scheduler 800 thereby serves to arbitrate between transmit requests and receive requests. The DMA Scheduler 800 contains four completely independent arbiters. Whenever a received DMA request and/or a transmit DMA request are pending, only one of the four state machines becomes active, depending on the relative priority of the request. If only one process has a request pending, a low priority request from the remaining processes will be assumed for purposes of activating one of the round robin arbiters.

For example, a low priority receive request with no accompanying transmit request will activate the round robin arbiter corresponding to two low priority requests, in this example weighted round robin arbiter 804. In the example embodiment the weighted round robin arbiters are programmable through registers, namely a register L, a register M, and registers I and J in the DMA Arbiter 220 as shown in FIG. 2.

As described above, the Lightly Weighted Round Robin Arbiter 802 during operation services two simultaneous high priority requests, and implements a more granular round robin weighting algorithm which may favor either the transmit or the receive requests. In the example embodiment of the Lightly Weighted Round Robin Arbiter 802, a single 4-bit weighting register L holds the desired weighting value. A single bit in a control register in Lightly Weighted Round Robin Arbiter 802, indicates whether the weighing favors the transmit request or the receive requests. In this way the control logic may select whether the transmit path or the receive path is favored for high priority requests.

In the Lightly Weighted Round Robin Arbiter 802, the 4-bit counter counts by one every two cycles and sticks at the value in the weighing register L. Non-weighted round robin arbitration takes place until the counter reaches the value in the weighing register L, at which point either of the receive or transmit request, is favored, depending on the state of the single bit in the control register. When back to back DMA cycles for the favored process take place as a result of the weighing, the counter is reset to 0. A weighing register value of 0 indicates that no weighing should take place. In this way, the Lightly Weighted Round Robin Arbiter 802 insures that when both transmit and receive requests are high priority, neither is starved, while also including means for providing unequal service for receive over transmit or vice versa.

FIG. 9 shows an example embodiment of a Priority Vector 900 generated during grant processing stage of stage one 400 as shown in FIG. 4. The example of Priority Vector 900 is shown including a TDA Valid field 905, a TPM Space field 910, a Below Threshold field 915, a Priority field 920, a Latency Predicted field 925, and a Tokens Predicted field 930.

The TDA Valid field 905 is set to true if there is a least one descriptor pointing to a segment with valid data in the TDA entry associated with the FIFO for this transmission request. The TPM Space field 910 is set to true if there is at least a predetermined minimum size worth of space left in the FIFO for this transmission request. The Below Threshold field 915 indicates when true that the FIFO for this transmission request is below a predetermined water mark value. The Priority field 920 contains the priority of the virtual circuit currently associated with the FIFO for this transmission.

The Latency Predicted field (also know as the CL Predicted field) 925 contains the predicted time elapsed since the last previous transmission on the virtual circuit currently associated with the FIFO for this transmission, at a future point in time either 4, 8, 16, or 32 cell times from the current time. Thus, the latency predicted field 925 is used to adjust for the time between when the calculation is made in stage one of the arbiter and the actual time subsequently when data is available for transmission. The Tokens Predicted field 930 contains the predicted number of sustained rate tokens which the virtual circuit currently associated with the FIFO will have accumulated 4, 8, 16, or 32 cell times from the current time. The specific number of cell times from the current time is programmable. The amount of time selected is dependant on the anticipated amount of time for a DMA request to be satisfied and for data to arrive at the head of a transmit FIFO.

The relative priority of two transmit requests is determined by comparison of the priority vectors for the two requests. Priority vectors are compared by the Transmit Data Scheduler 600 as shown in FIG. 6 to find the highest priority transmit data request currently asserted.

Priority vectors are compared field by field, from left to right. The left most fields are relatively more important, and therefore their values are controlling. For example, if a first priority vector has a TDA Valid field 905 that is True, and the TDA Valid field 905 of a second priority vector is false, then the first priority vector is of higher priority, and no further fields need be compared. However, if the TDA Valid field 905 in the second priority vector is also true, then the values of the next field to the right are compared. If the TPM Space field 910 is true in the first priority vector, and the TPM Space field 910 is false in the second priority vector, then the first priority vector is higher priority, and no further fields need be compared.

This process continues through potentially all of the fields shown in FIG. 9. If the TPM Space fields of two priority vectors are both true, then the Below Threshold fields 915 are compared. If the first priority vector Below Threshold field 915 is true, and the second priority vector Below Threshold field 915 is false, then the first priority vector is higher priority, and no further comparisons are made. If the Below Threshold fields 915 are both true, then the Priority fields 920 are compared. If the Priority field contains a higher value in one of the priority vectors being compared, then that priority vector is higher priority, and the comparison ends. If both priority vectors have the same value in the Priority field 920, then the CL Predicted field 925 values are compared. If either of the priority vectors has a larger CL Predicted field value, then that priority vector is higher priority. If the values of the CL Predicted fields are the same, then the value in the Tokens Predicted fields 930 are compared. If one of the priority vectors has a higher Tokens Predicted field value than the other priority vector, then it is higher priority. If at that point the two priority vectors being compared have equal Tokens Predicted field 930 values, then a random selection is made to determine which of the priority vectors being compared is higher priority.

Figure 10:
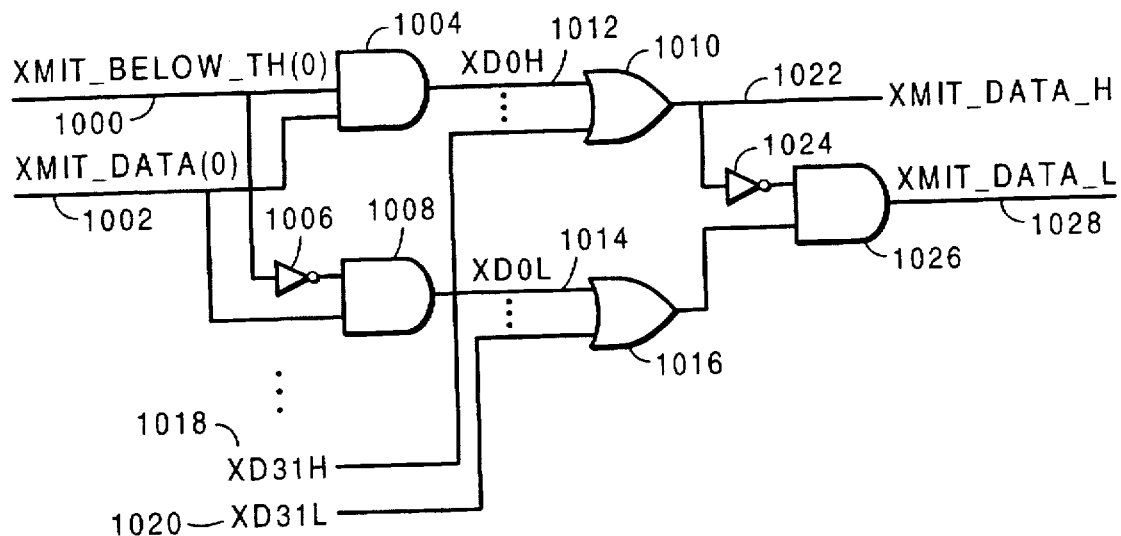
FIG. 10 is a drawing of an example embodiment of request processing logic within stage one of the arbitration as shown in FIG. 4 for processing transmit data requests.

FIG. 10 shows an example embodiment of request logic used during request processing within the first arbitration stage 400 as shown in FIG. 4. The logic in FIG. 10 is shown to include AND gate 1004, AND gate 1008, inverter 1006, OR gate 1010, OR gate 1016, inverter 1024, and AND gate 1026. The inputs to AND gate 1004 are Transmit Below Threshold N 1000 and Transmit Data Request N 1002 shown for purposes of example as Transmit Below Threshold 0 and Transmit Data Request 0. Note that the logic for Transmit Below Threshold 0 and Transmit Data 0 are repeated for Transmit Below Threshold 1 through N, where N is the total number of possible transmit data requesters.

The inputs Transmit Below Threshold 1000 and Transmit Data Request 1002 are fed to AND gate 1004. Also, the inverted Transmit Below Threshold 1000 and Transmit Data 0 are fed to AND gate 1008. The output of AND gate 1004, is signal XDOH 1012 which is an input into OR gate 1010. Other outputs of identical logic for other transmit data request signals and transmit below threshold signals also are fed into OR gate 1010, up through signal XD31H. The output of AND gate 1008 is signal XDOL 1014. It is input into OR gate 1016 along with signals similarly derived by identical logic, namely XD1L-XD31L.

The output of OR gate 1010 is the signal Transmit Data High 1022. Signal Transmit Data High 1022 is also fed through inverter 1024 and then into AND gate 1026 along with the output from OR gate 1016. The output of AND gate 1026 is the signal Transmit Data Low 1028.

The signal Transmit Data 0 (XMIT_DATA(0)) 1002 corresponds with Transmit Data 0 406 as shown in FIG. 4. Similarly, Transmit Data 1 through Transmit Data 31 in 406 of FIG. 4 are processed by identical logic as shown for Transmit Data 0 1002 in FIG. 10. The signal Transmit Data High 1022 corresponds with signal Transmit Data High 414 as shown in FIG. 4. The signal Transmit Data Low 1028 corresponds with the signal Transmit Data Low 4016 as shown in FIG. 4.

During operation of the elements shown in FIG. 10, the requests for the DMA 225 by the Control Logic 215 to move data from the host memory into transmit FIFOs in the adapter are processed, during the request processing phase of operation, by the logic shown to derive the outputs Transmit Data High 1022 and Transmit Data low 1028.

Further during request processing in stage 1 of the arbitration system shown in FIG. 4, transmit descriptor requests are processed by logic similar to the logic shown in FIG. 10 for transmit data requests. The logic for processing transmit descriptor requests is the same as shown in FIG. 10, but having different input signals. Specifically, XMIT_DATA (0) is replaced by XMIT_DESC(0) (element 408 as shown in FIG. 4). The signal XMIT_DESC(0) is asserted when there is a transmit descriptor request for the FIFO corresponding with Transmit Queue 0. XMIT_DESC_H (418 in FIG. 4) and XMIT_DESC_L (420 in FIG. 4) are therefore derived identically as XMIT_DATA_H 1022 and XMIT_DATA_L 1028, albeit from the inputs XMIT_DESC(0)-(31) rather than XMIT_DATA(0)-(31).

Figure 11:
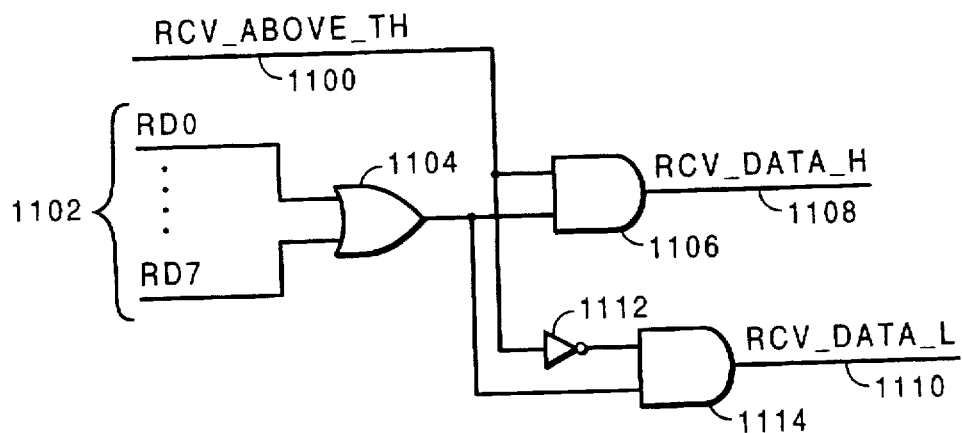
FIG. 11 is a drawing of an example embodiment of request processing logic in stage one of the arbitration as shown in FIG. 4 for processing receive data requests.

FIG. 11 shows an example embodiment of request logic for processing receive data requests in the first arbitration stage 400 as shown in FIG. 4. The elements of FIG. 11 operate during the request processing phase of operation. The logic shown in FIG. 11 includes OR gate 1104, AND gate 1106, inverter 1112, and AND gate 1114. The inputs to OR gate 1104 are signals RD0 through RD7. The signals RD0 through RD7 1102 correspond with signals Receive Data Request 0 through Receive Data Request 410 in FIG. 4. The signal Receive Above Threshold 1100 is generated by the Control Logic 215 and indicates when asserted that the occupancy level of the Reassembly Memory 211 is above a programmable threshold. Thus, Receive Above Threshold signal 1100 indicates that Reassembly Memory 211 is running out of available space. The output of the OR gate 1104 is fed both into AND gate 1106 and AND gate 1114. Also fed into AND gate 1106 is signal receive above threshold 1100. Also fed into AND gate 1114 is the inverse of signal Receive Above Threshold 1100.

The output of AND gate 1106 is Receive Data High signal 1108. The output of AND gate 1114 is the Receive Data Low 1110. Signal Receive Data High 1108 corresponds with signal Receive Data High 422 as shown in FIG. 4. Signal Receive Data Low 1110 corresponds with signal Receive Data Low 424 as shown in FIG. 4.

Figure 12:
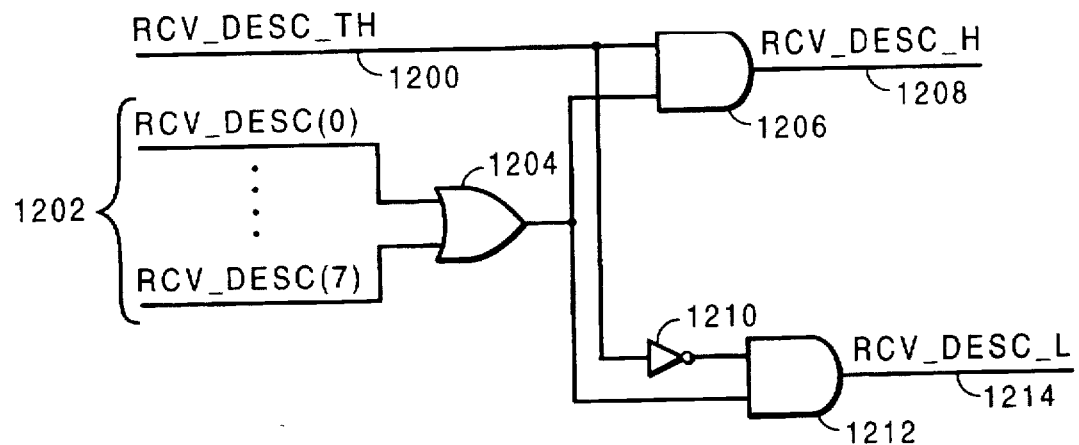
FIG. 12 is a drawing of an example embodiment of request processing logic in stage one of the arbitration as shown in FIG. 4 for processing receive descriptor requests.

FIG. 12 shows an example embodiment of logic in the first arbitration stage 400 as shown in FIG. 4 for processing receive descriptor requests during the request processing phase of operation. The logic in FIG. 12 is shown to include an OR gate 1204, an AND gate 1206, an inverter 1210, and an AND gate 1212. A Receive Descriptor Threshold signal 1200 is asserted when an entry in the Receive Descriptor Array for any one of the 8 Receive Queues in Host Memory has less than a predetermined number of receive descriptors, for example, zero receive descriptors. The input Receive Descriptor 0 (RCV_DESC(0)) through Receive Descriptor 7 (RCV_DESC(7)) 1202 into OR gate 1204 corresponds with Receive Descriptor 0 through Receive Descriptor 7 signals 412 as shown in FIG. 4.

The output of OR gate 1204 is fed into both AND gate 1206 and AND gate 1212. The signal Receive Descriptor Threshold 1200 is fed into AND gate 1206 and inverted by inverter 1210 and the inverted signal is subsequently fed to AND gate 1212. The output 1206 is signal Receive Descriptor High 1208 and corresponds with signal Receive Descriptor High 426 as shown in FIG. 4. The output of AND gate 1212 is the signal Receive Descriptor Low 1214 which corresponds with the signal Receive Descriptor Low 428 as shown in FIG. 4.

Figure 13:
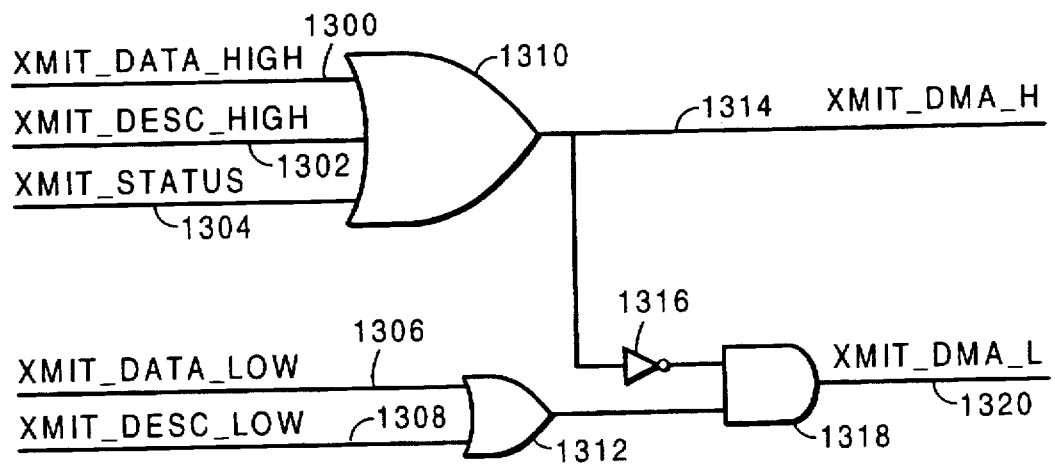
FIG. 13 is a drawing of an example embodiment of request processing logic in the second stage of the arbitration shown in FIG. 4 for processing transmit data and transmit descriptor requests.

FIG. 13 is an example embodiment of logic in the second arbitration stage 402 as shown in FIG. 4 for processing transmit requests during request processing. The logic in FIG. 13 is shown including an OR gate 1310, an OR gate 1312, an inverter 1316, and an AND gate 1318. The inputs into OR gate 1310 are Transmit Data High signal 1300, Transmit Descriptor High signal 1302, and Transmit Status signal 1304. The inputs to OR gate 1312 are Transmit Data Low signal 1306, Transmit Descriptor Low signal 1308. The output of OR gate 1310 is Transmit DMA High signal 1314, the output of OR gate 1312 is input into AND gate 1318. Further, the output of OR gate 1310 is also fed into inverter 1316, and the inverted signal subsequently into AND gate 1318. The output of AND gate 1318 is Transmit DMA Low signal 1320.

The signal Transmit Data High 1300 corresponds with signal Transmit Data High 414 as shown in FIG. 4. Similarly, signal 1302 Transmit Descriptor High corresponds with signal Transmit Descriptor High 418, and the signal Transmit Status 1304 corresponds with the signal Transmit Status 430. Also, the signal Transmit Data Low 1306 corresponds with the signal Transmit Data Low 416, and the signal Transmit Descriptor Low 1308 corresponds with the signal Transmit Descriptor Low 420 as shown in FIG. 4. The signal Transmit DMA High 1314 in FIG. 13 corresponds with the signal Transmit DMA high 434 and the signal Transmit DMA Low 1320 corresponds with the signal 436.

Figure 14:
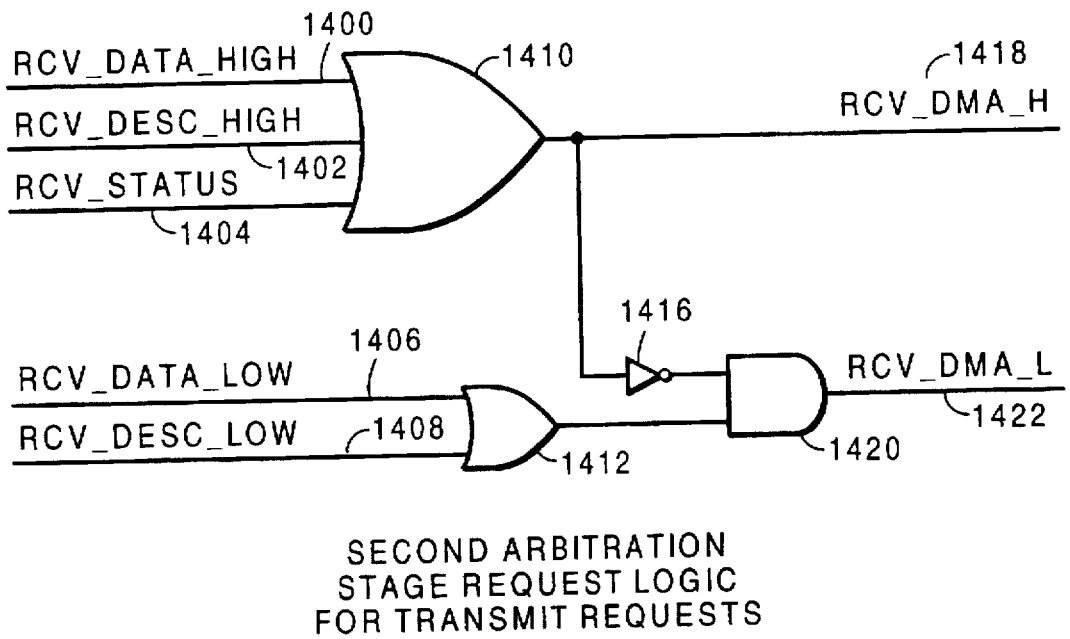
FIG. 14 is a drawing of an example embodiment of request processing logic in the second arbitration stage for processing receive data requests.

FIG. 14 shows an example embodiment of logic for processing transfer requests within the second arbitration stage 402 as shown in FIG. 4. The logic shown in FIG. 14 is used during request processing. The logic in FIG. 14 is shown to include an OR gate 1410, an OR gate 1412, an inverter 1416, and an AND gate 1420. The inputs to OR gate 1410 are the signal Receive Data High 1400, the signal Receive Descriptor High 11402, and the signal Receive Status 1404.

The inputs to OR gate 1412 are the signal Receive Data Low 1406 and the signal Receive Descriptor Low 1408. The output of OR gate 1410 is the signal Receive DMA High 1418. The output of OR gate 1410 is also fed through inverter 1416 and subsequently the inverted signal is passed to AND gate 1420. Another input of AND gate 1420 is the output of OR gate 1412. The output of AND gate 1420 is the signal Receive DMA low 1422.

The signal Receive Data High 1400 corresponds with the signal Receive Data High 422 in FIG. 4. Similarly, the signal Receive Descriptor high 1402 corresponds with the signal Receive Descriptor High 426, and the signal Receive Status 1404 corresponds with the signal Receive Status 432. The signal 1406 Receive Data Low corresponds with the signal Receive Data Low 434 in FIG. 4 and the signal Receive Descriptor Low 1408 corresponds with the signal Receive Descriptor Low 428. The signal Receive DMA High 1418 corresponds with the signal Receive DMA High 438 in FIG. 4 and the signal Receive DMA Low 1422 corresponds with the signal Receive DMA Low 432.

Figure 15:
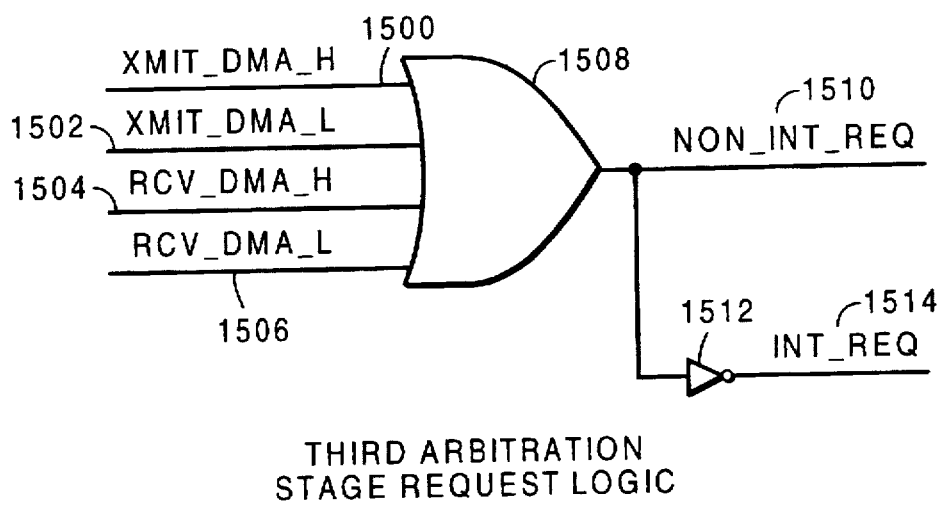
FIG. 15 is a drawing of an example embodiment of request processing logic in the third arbitration stage.

FIG. 15 shows an example embodiment of logic in the third arbitration stage as shown in FIG. 4 used for request processing. The logic in FIG. 15 shows OR gate 1508. The inputs to the OR gate 1508 are Transmit DMA High signal 1500, Transmit DMA Low signal 1502, Receive DMA High Signal 1504 and a Receive DMA Low signal 1506. The output of OR gate 1508 is the signal Normal Request Selected 1510. The signal Normal Request Selected 1510 is passed through an inverter 1512 with the resultant inverted signal being passed as input into AND gate 1513. The AND gate 1513 further has as input the signal Error and Maintenance Request 1516, corresponding with signal 470 as shown in FIG. 4. The output of the AND gate 1513 is Error and Maintenance Request selected signal 1514.

The signal 1500 Transmit DMA High corresponds with the signal 434 Transmit DMA High as shown in FIG. 4. Similarly, the signal Transmit DMA Low 1502 corresponds with the signal Transmit DMA Low 436, and the signal Receive DMA High 1504 corresponds with the signal Receive DMA High 438. Also, the signal DMA Low 1506 corresponds with a signal DMA Low 440 in FIG. 4, and the signal Normal Request Selected 1510 corresponds with the signal 462 as shown in FIG. 4. And the signal Error and Maintenance Request 1514 corresponds with the signal Error and Maintenance Status Update Request Selected 467 as shown in FIG. 4.

While the invention has been described with reference to specific example embodiments, the description is not meant to be construed in a limiting sense. Various modifications of the disclosed embodiment, as well as other embodiments of the invention, will be apparent to person skilled in the art upon reference to this description. It is therefore contemplated that the appended claims will cover any such modifications or embodiments which fall within the true scope of the invention.

We claim:

1. A system for arbitrating between multiple requests for a shared resource, wherein said shared resource is a Direct Memory Access logic within a network adapter, and said Direct Memory Access logic is coupled with a data bus in a host computer system, comprising:

first determining means for determining a priority of each request in a first request class, said first request class consisting of transmit data requests to use said Direct Memory Access logic to read transmit data from a host memory in said host computer system, said transmit data to be transmitted onto a network coupled with said network adapter;

second determining means for determining a high or a low priority of each request in a second request class, said second request class consisting of receive data requests to use said Direct Memory Access logic to write receive data from said network adapter into said host memory;

first selecting means, responsive to said first determining means, for selecting a first selected request equal to one of said requests in said first request class having a highest priority;

second selecting means, responsive to said second determining means, for selecting a second selected request equal to one of said requests in said second request class having a high priority;

weighted arbitration means, for choosing between said first selected request and said second selected request based on a 1 of N round robin arbitration, said second selected request selected once every N times said shared resource is available, and N is a predetermined integer;

means for generating a priority vector associated with each transmit data request, higher values of said priority vector indicating higher priority, said priority vector including a predicted latency field;

means for calculating a value 'CL' for each transmit data request, where CL is equal to an estimated time period since the last transmission on the virtual circuit for each specific transmit data request estimated to have elapsed at the time said transmit data is actually read from said host memory into said network adapter; and means for writing said value CL into the priority vector for each said transmit data request.

2. The system as in claim 1, further comprising:

one or more Receive Queues for indicating reassembled packets received into said network adapter from said network and stored in a Reassembly Memory;

each said receive data request is associated with one of said Receive Queues; and wherein said second determining means determines that a given receive data request is high priority if the occupancy level of said Reassembly Memory is greater than a predetermined amount.

3. A method for arbitrating between multiple requests for a shared resource, comprising the steps of:

determining a priority of each request in a first request class, said first request class consisting of transmit data requests to use said shared resource, by generating a priority vector associated with each transmit data request, higher values of said priority vector indicating higher priority, said priority vector including a predicted latency field a contents of said predicted latency field equal to a time period estimated to have elapsed since a last previous transmission on a virtual circuit associated with said each transmit data request at a subsequent time when transmit data for said data request is read from a host memory into a network adapter, and by comparing said priority vector of each said request in said first request class;

determining a high or a low priority of each request in a second request class, said second request class consisting of receive data requests to use said shared resource;

selecting, responsive to said first determining means, a first selected request equal to one of said requests in said first request class having a highest priority;

selecting, responsive to said second determining means, a second selected request equal to one of said requests in said second request class having a high priority; and choosing between said first selected request and said second selected request based on a 1 of N round robin arbitration, said second selected request selected once every N times said shared resource is available, and N is a predetermined integer.

* * * * *